United States Patent [19]

Kitahara

[11] Patent Number: 4,710,915
[45] Date of Patent: Dec. 1, 1987

[54] LOOP TRANSMISSION SYSTEM HAVING AUTOMATIC LOOP CONFIGURATION CONTROL MEANS

[75] Inventor: Takeshi Kitahara, Kawasaki, Japan
[73] Assignee: Fujitsu Limited, Kawasaki, Japan
[21] Appl. No.: 753,960
[22] Filed: Jul. 11, 1985

[30] Foreign Application Priority Data

Jul. 13, 1984 [JP] Japan .................. 59-145702

[51] Int. Cl.$^4$ ................................ H04J 3/14
[52] U.S. Cl. ........................ 370/16; 370/88
[58] Field of Search ................... 370/88, 16; 179/175.3 S; 340/825.01

[56] References Cited

U.S. PATENT DOCUMENTS

| | | | |
|---|---|---|---|
| 3,569,632 | 3/1971 | Beresin | 370/16 |
| 3,859,468 | 1/1975 | Smith et al. | 370/88 |
| 3,876,983 | 4/1975 | Zafiropulo et al. | 179/175.3 S |
| 4,190,821 | 2/1980 | Woodward | 370/16 |
| 4,527,270 | 7/1985 | Sweeton | 370/88 |

FOREIGN PATENT DOCUMENTS 0102222 3/1984 European Pat. Off. .

OTHER PUBLICATIONS

"A Token-Ring Architecture for Local-Area Networks", Andrews et al., Mar. 8, 1982, pp. 1-27, (International Business Machines Corporation, Communication Products Division).

Primary Examiner—Douglas W. Olms
Attorney, Agent, or Firm—Staas & Halsey

[57] ABSTRACT

A token-passing type loop transmission system including a plurality of node stations and first and second loop transmission lines, which lines transmit signals in opposite directions. Each node station includes a first and second loop-back circuits and a ring control circuit. The ring control circuit monitors signals passing through the node station, changes end paths in the first and second loop-back circuits to operatively connect the first and second loop transmission lines or to restore the first and second loop transmission lines to a normal state in each loop-back circuit, and transmits a signal on the first or second loop transmission line through the first or second loop-back circuit. By the combination of operations of the node stations, the loop transmission system performs automatic loop configuration control of detection of a fault point therein and constructs a transmission loop line not including the fault point.

10 Claims, 40 Drawing Figures

Fig. 5

| SD | AC | FC | DA | SA | INF | FCS | ED | FS |

SD : STARTING DELIMITER

AC : ACCESS CONTROL

FC : FRAME CONTROL

DA : DESTINATION ADDRESS

SA : SOURCE ADDRESS

INF : INFORMATION

FCS : FRAME CHECK SEQUENCE

ED : ENDING DELIMITER

FS : FRAME STATUS

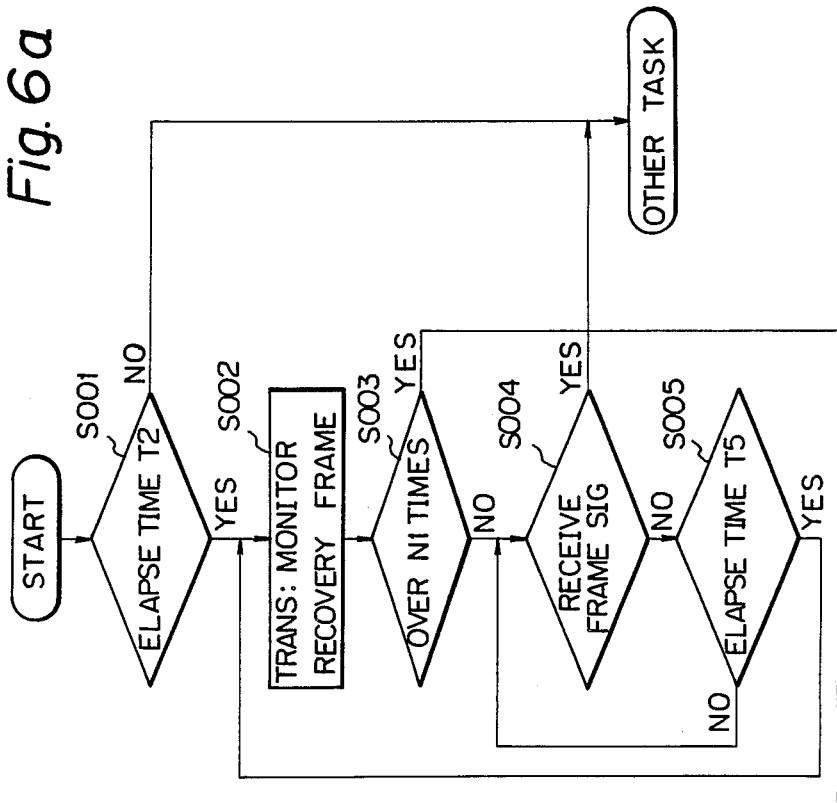

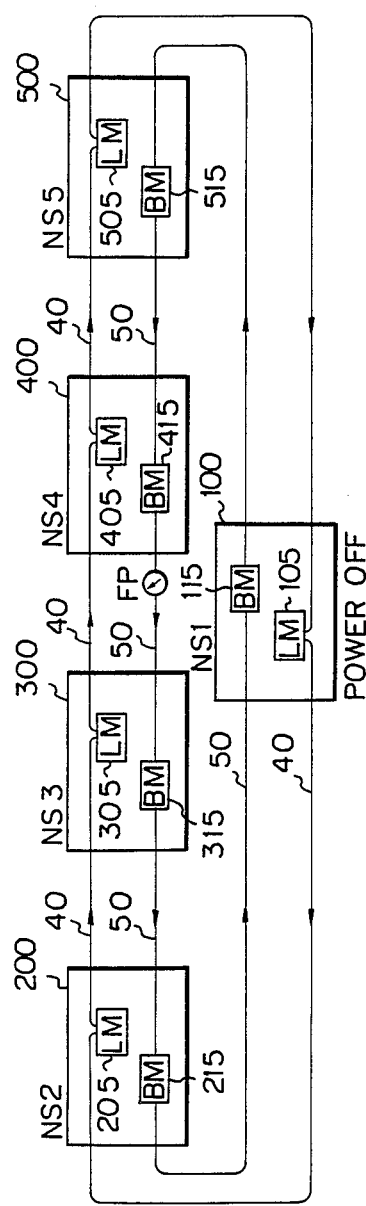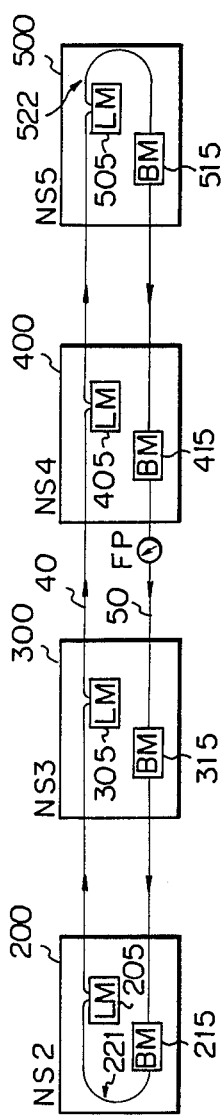
Fig. 7a
Fig. 7b

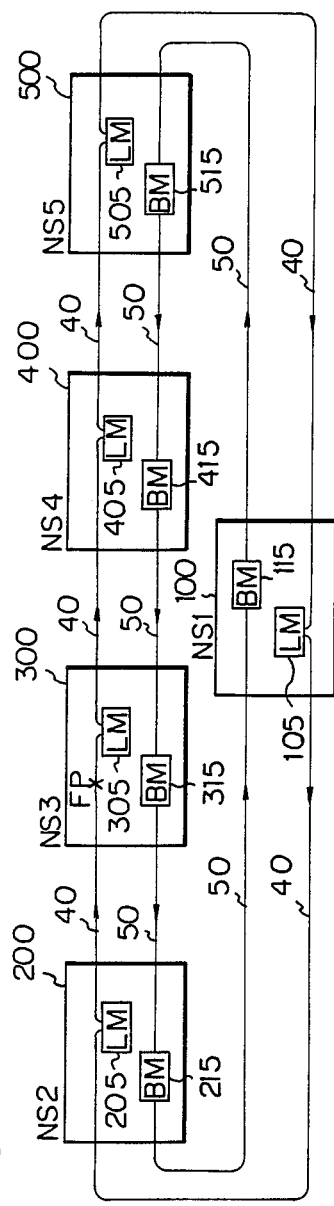
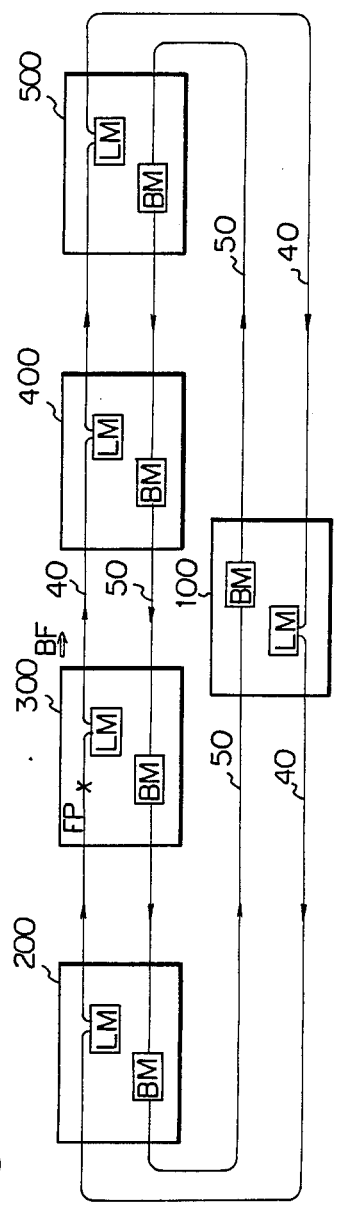
Fig. 8a
Fig. 8b

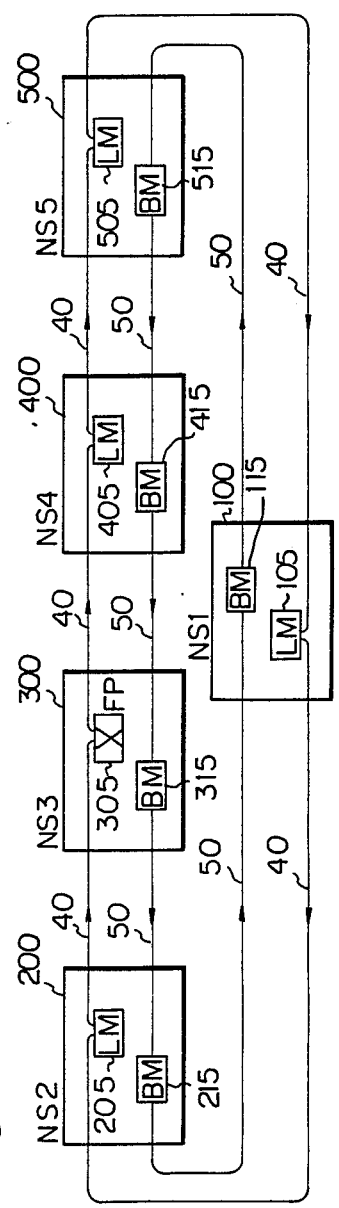
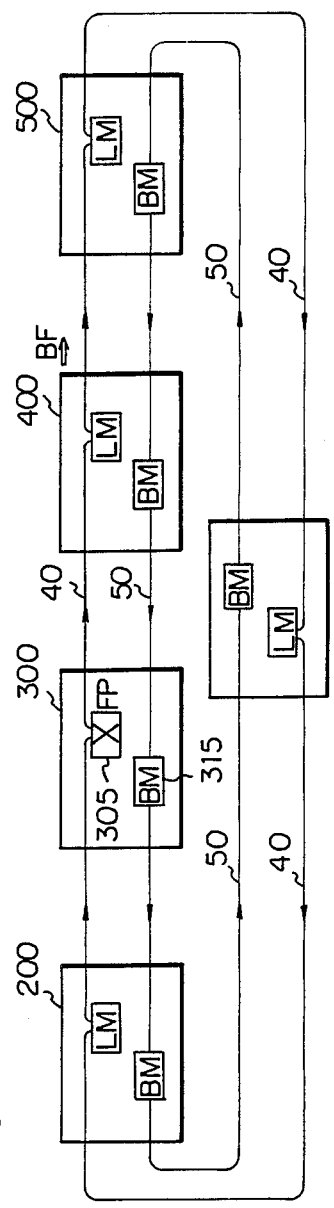
Fig. 9a
Fig. 9b

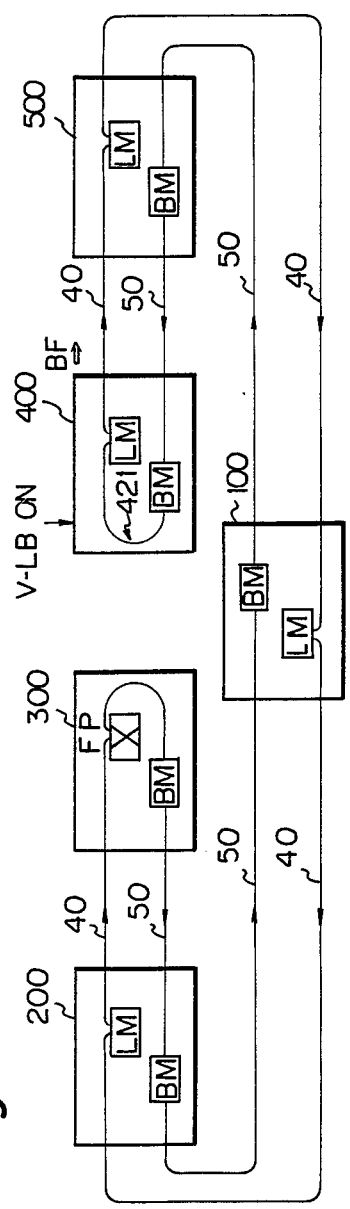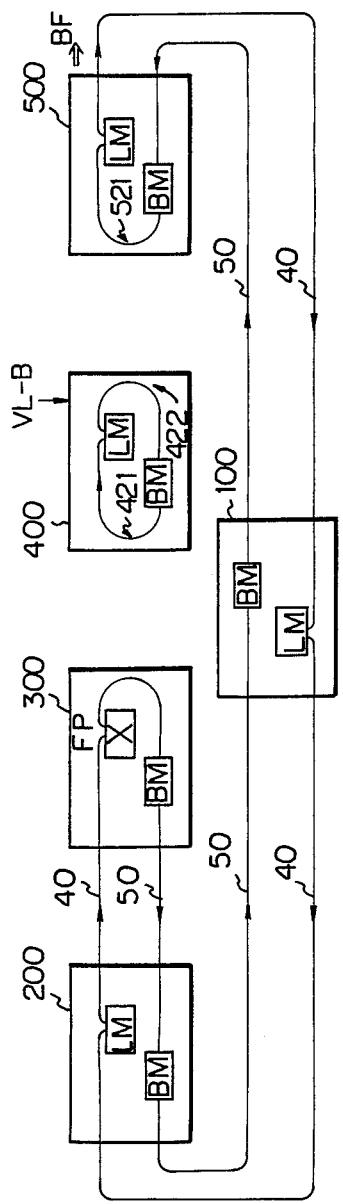

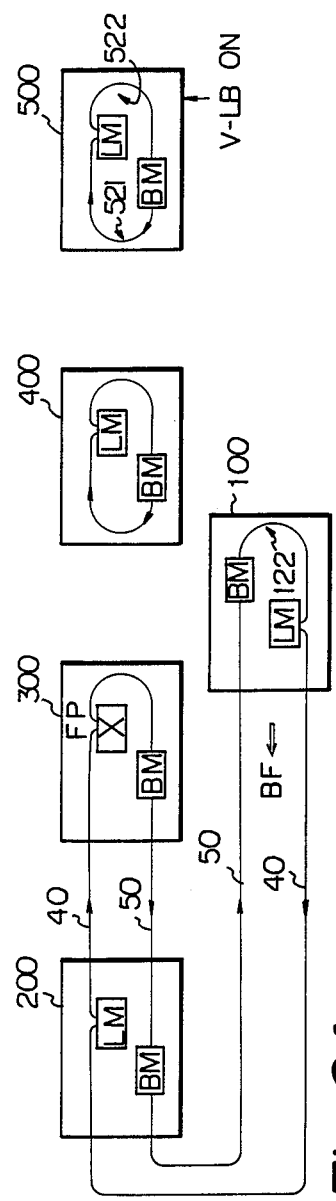
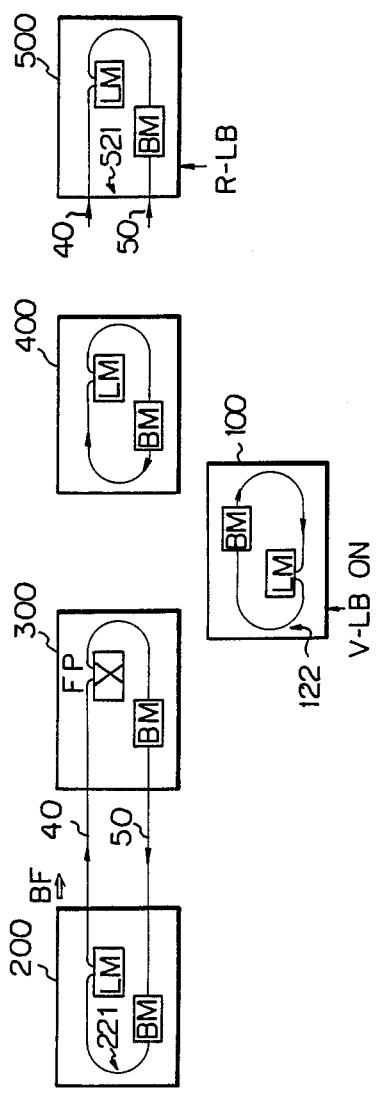

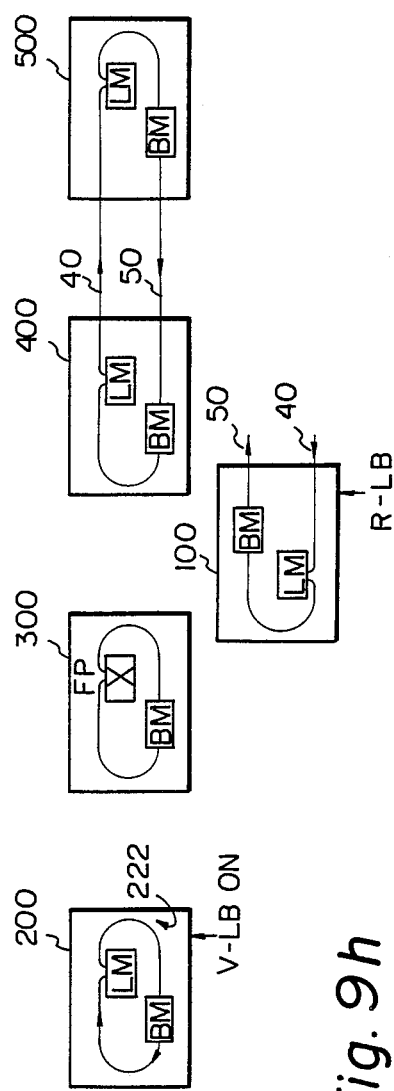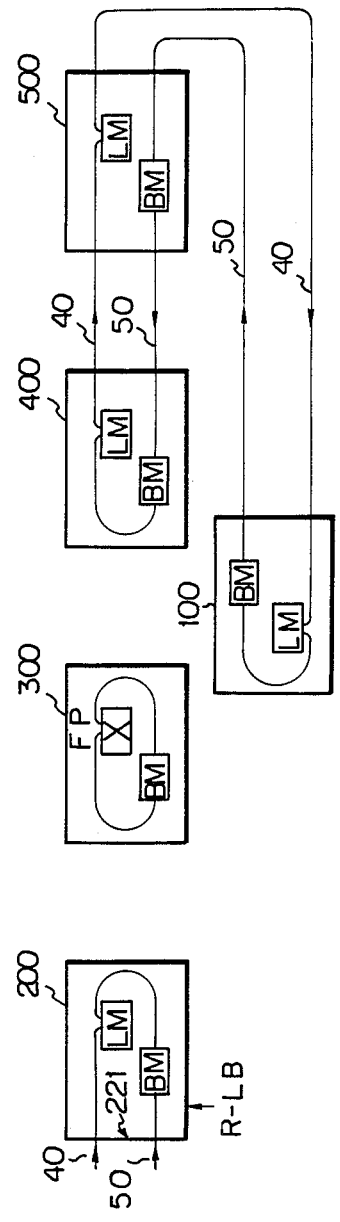
Fig. 9g
Fig. 9h

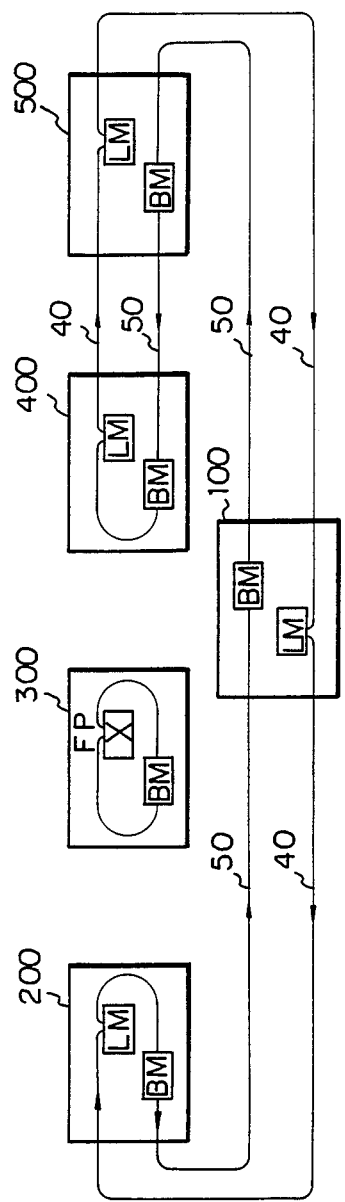

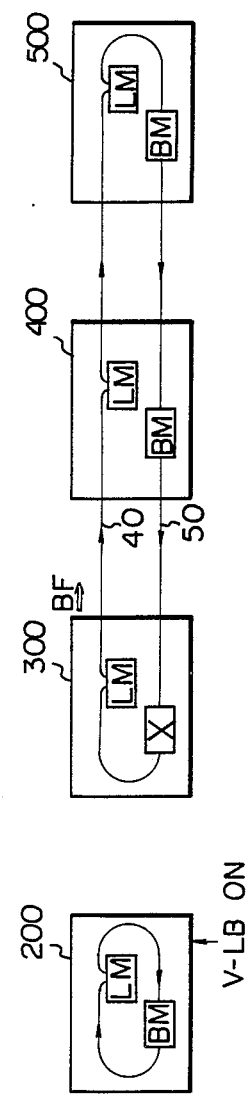
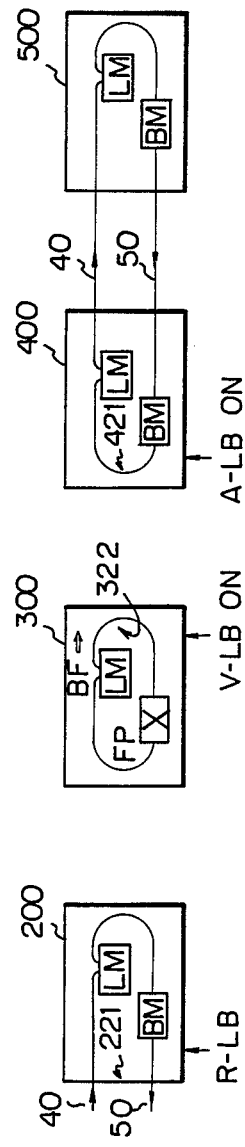

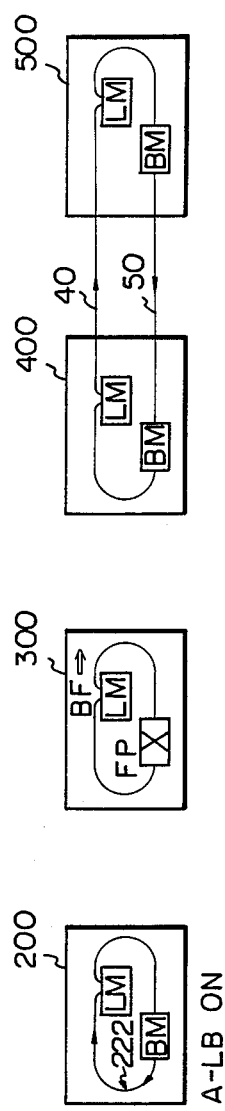
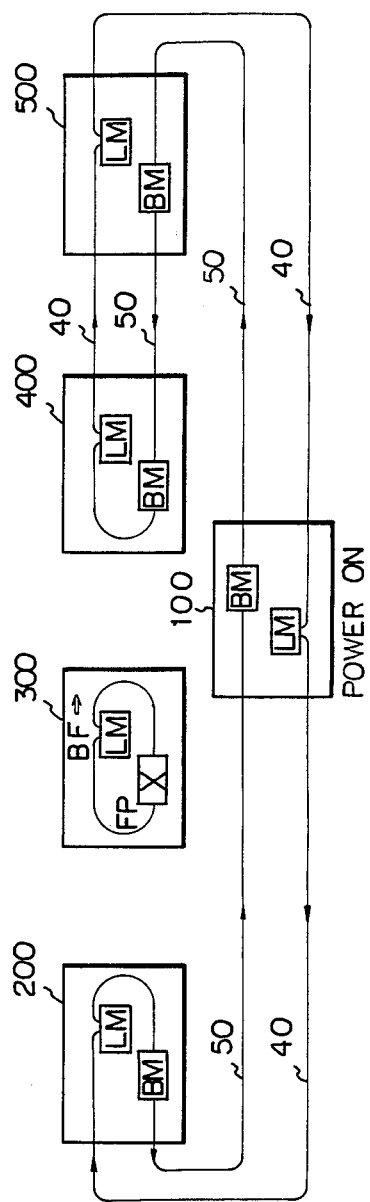

LOOP TRANSMISSION SYSTEM HAVING AUTOMATIC LOOP CONFIGURATION CONTROL MEANS

BACKGROUND OF THE INVENTION

1. Field of the Invention

The present invention relates to a loop transmission system which includes a plurality of loop-connected node stations, each station including two loop-back circuits, and, more particularly, to a token-passing type loop transmission system without a supervisory loop control apparatus therein, which can detect and identify a fault point therein and can construct a loop transmission line not including the fault point. That is, the present invention relates to a loop transmission system having an automatic loop (or link) configuration control (ALCC) means.

2. Description of the Related Art

Recent factory automation systems, laboratory automation systems, office automation systems, and the like make use of advanced communication systems including a plurality of processors and a plurality of terminal devices suitably connected in accordance with system conditions for optimum distribution of tasks and/or optimum formation of communication paths. The so-called "local area network" (LAN) system represents a typical communication system with loop (or link) connection type transmission.

Generally, a loop transmission system includes a plurality of node stations loop-connected one by one by a communication line, for example, an optical fiber cable, and a plurality of terminal devices and a plurality of processors which may be connected to corresponding node stations. The node stations connect the terminal devices or the processors to the communication line or disconnect the terminal devices or the processors from the communication line.

The node stations are chain-connected. Accordingly the loop transmission system can fail completely if one of the node stations fails or the communication line breaks down, resulting in a breakdown of the loop path. In order to overcome this problem, two communication lines may be provided: a master loop line and sub-loop line for connecting adjacent node stations. There may also be provided master (or an upper) and slave (or a lower) loop-back circuits in each node station. In a normal condition a loop-back circuit is connected to the separate master and sub-loop lines introduced therein for passing signals on the lines. In a non-normal condition, however, the loop-back circuit, for example, the master loop-back circuit, connects the master loop line and sub-loop line to form a loop-back ON state and, accordingly, disconnects (separates) the node station in question and an adjacent node station positioned at a preceding position thereof. As a result, on the one hand, a transmission signal on the main loop line output from the preceding node station cannot reach the node station in question. On the other hand, a transmission signal on the sub-loop line output from an adjacent node station positioned at a following position thereof can be returned to the following node station through the main loop line connected to the sub-loop line at the master loop-back circuit. This helps transmission loop reconfiguration in the loop transmission system.

In the prior art, a known loop transmission system includes a supervisory station for reconfiguring the loop construction (for example, EPC Publication No. 0102222, Mar. 7, 1984). The loop transmission system, however, requires an extra supervisory loop control station and suffers from disadvantages of low availability in the case of failure of that supervisory loop control station, a low speed of reconfiguration of the loop and high cost.

There is also a known token-passing system without a supervisory station, for example "A Token-Ring Architecture for Local-Area Networks," by D. W. Andrews and G. D. Schultz, Mar. 8, 1982, IEEE Project 802 on Local Area Networks. In this field, "token" means polling information. The loop transmission system of the present invention pertains to this type of loop transmission system. However, the token-passing systems of the prior art suffer from the disadvantage of low availability and difficult system maintenance.

SUMMARY OF THE INVENTION

It is an object of the present invention to provide a loop transmission system which can automatically detect a fault therein, identify a fault point, remove the fault point from the loop transmission system, and construct an available reconfigured loop transmission system.

It is another object of the present invention to provide a loop transmission system with increased availability of operation.

It is still another object of the present invention to provide a loop transmission system allowing easy maintenance.

According to the present invention, there is provided a loop transmission system including: a plurality of node stations; and first and second loop transmission lines. The lines transmit signals in opposite directions. Each forms a separate closed loop transmission line including the plurality of node stations in a normal mode. Each node station comprises first and second loop-back circuits operatively connected to the first and second loop transmission lines at opposite ends in the node station for passing signals through the node station and a ring control circuit. A ring control circuit monitors the signals passing through the node station, changes end paths in the first and second loop-back circuits to operatively connect the first and second loop transmission lines or to restore the first and second loop transmission lines in the normal state in each loop-back circuit, and transmits a signal on the first or second loop transmission line through the first or second loop-back circuit. Through the combination of operations of the plurality of node stations, the loop transmission system detects a fault point therein and constructs a reconfigured transmission loop not including the fault point.

Preferably, the ring control circuit in the node station includes a circuit for detecting an abnormal state on the first and second transmission loop lines; a circuit for activating the first loop-back circuit to automatically connect the first and second loop transmission lines in the first loop-back circuit when a predetermined format signal on the first transmission loop line is extinguished; and a circuit for activating the second loop-back circuit to automatically connect the first and second loop transmission lines in the second loop-back circuit when another predetermined format signal on the second loop transmission line is extinguished.

The ring control circuit also includes a circuit for activating the first loop-back circuit to restore the connection of the first and second loop transmission lines from the automatic loop-back ON state to the loop-back OFF state when the predetermined format signal on the first loop transmission line appears and a circuit for activating the second loop-back circuit to restore the connection of the first and second loop transmission loop lines from the automatic loop-back ON state to the loop-back OFF state when the other predetermined signal on the second loop transmission line appears.

The ring control circuit further includes a circuit for activating the first and/or second loop-back circuits to place the first and second loop transmission lines in the voluntary loop-back ON state when the abnormal state detecting circuit detects an abnormal state, a circuit for detecting a normal state on the first and second loop transmission lines after the first and/or second loop-back circuit are placed in the voluntary loop-back ON state, and a circuit for activating the first and/or second loop-back circuit to restore the connection of the first and second loop transmission lines from the voluntary loop-back ON state to the loop-back OFF state when the normal state detecting circuit detects a normal state.

BRIEF DESCRIPTION OF THE DRAWINGS

Other objectives and features of the present invention will be described below in detail with reference to the accompanying drawings, in which:

FIG. 5 is a view of a transmission signal format;

FIGS. 7a to 7g are views showing the automatic loop configuration control operation in a loop transmission system including the node stations in FIG. 2 for a first type of fault;

FIGS. 8a to 8d are views showing the automatic loop configuration control operation for a second type of fault;

FIGS. 9a to 9i are views showing the automatic loop configuration control operation for a third type of fault;

FIGS. 10a to 10f are views showing automatic loop configuration control operation for a fourth type of fault.

DESCRIPTION OF THE PREFERRED EMBODIMENTS

Figure 1:
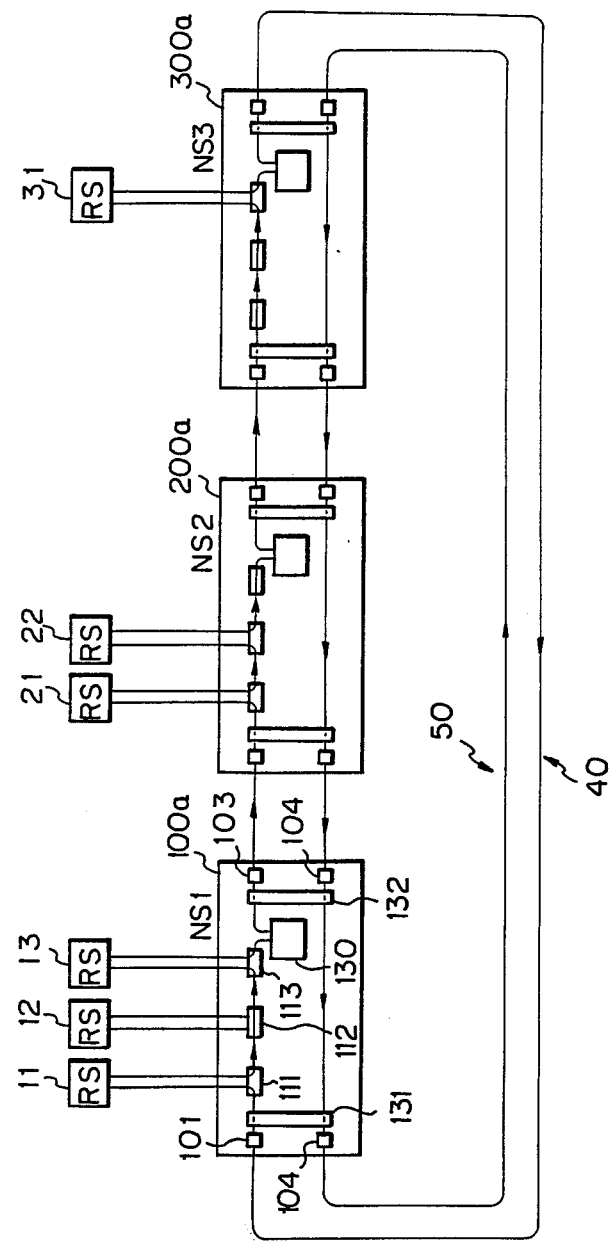
FIG. 1 is a block diagram of a transmission system of the prior art.

Before describing a preferred embodiment of the present invention, an explanation will be given of the prior art for reference. FIG. 1 is a block diagram of a loop transmission system of the prior art. In FIG. 1, the loop transmission system includes a plurality of node stations (NS1 to NS3) 100a to 300a which are loop (link)-connected by means of duplicate communication lines, i.e., a main loop line 40 and a sub-loop line 50. The loop lines 40 and 50 are optical fiber cables. The loop transmission system also includes a plurality of ring stations (RS) 11 to 13, 21, 22, and 31, which may be "in-line" in the corresponding node stations. The node station 100a consists of opto-electrical (O/E) converters 101 and 102, electro-optical (E/O) converters 103 and 104, ring station switching circuits 111 to 113, a master (or upper) loop-back circuit 131, a slave (or lower) loop-back circuit 132, and a loop monitor circuit 130. The other node stations 200a and 300a have the same construction as the node station 100a.

In FIG. 1, the ring stations 11 and 13 are "in-line" in the main loop line 40 at the node station 100a. However, the ring station 12 is bypassed from the main loop line 40. The above selection of the ring stations as in-line or bypassed is effected by the ring station switching circuits 111 to 113. Similarly, the ring stations 21, 22, and 31 are connected to the main loop line 40.

The loop monitor circuit 130 monitors the state of the main loop line 40 and detects disappearance of the frame signal, reproduces the frame signal, and transmits an error-notice-frame, i.e., a beacon-frame signal, when reproduction of the frame signal fails. The master loop-back circuit 131 receives a signal such as a carrier on the main loop line 40 which is converted from an optical signal to an electrical signal at the O/E converter 101. When the master loop-back circuit 131 detects loss of the above signal, the master loop-back circuit 131 effects a loop-back, that is, the main loop line and the sub-loop line are connected in the master loop-back circuit 131. On the other hand, the slave loop-back circuit 132 receives a signal or a carrier on the sub-loop line 50, and when the signal level or the carrier is lost, it effects a loop-back as mentioned above with respect to the master loop-back circuit 131.

If the loop monitor circuit in the node station 200a fails, the transmission signal on the main loop line 40 is lost at the node station 200a. Thus, the following node station 300a detects the disappearance of the frame signal included in the transmission signal. The loop monitor circuit in the node station 300a tries to reproduce the frame signal, that is, to output the frame signal to the node station 100a through the main loop line 40. The reproduced frame signal, however, is extinguished again at the node station 200a including the failed loop monitor circuit. As a result, the node station 300a recognizes failure of the frame signal reproduction and then outputs the beacon frame signal to the following node station 100a through the main loop line 40.

In the prior art loop transmission system, no means for separating out or removing a failed node station is provided. Consequently, the loop transmission system fails completely with the consecutive transmission of the beacon frame signal from the node station 300a or with the consecutive transmission of the beacon frame signal from the node station 300a after completion of the loop-back operation for the main loop-back circuit in the node station 300a. Clearly, this means low availability of the loop transmission system.

A loop transmission system in accordance with the present invention will now be explained.

Figure 2:
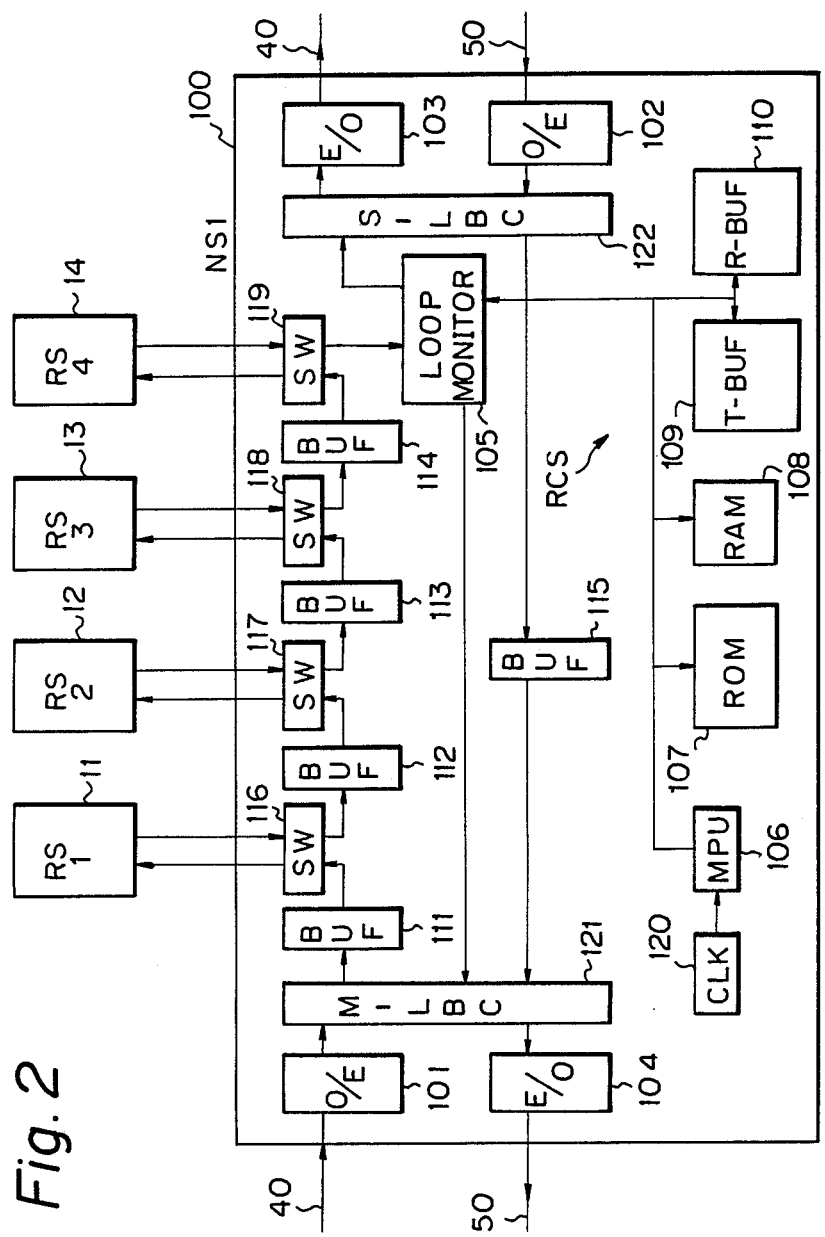
FIG. 2 is a circuit diagram of an embodiment of a node station in accordance with the present invention.

FIG. 2 is a circuit diagram of an embodiment of a node station in accordance with the present invention. The node station (NS1) 100 in FIG. 2 corresponds to the node stations 100a to 300a in FIG. 1, it however, differs in circuit configuration and function. However, the loop construction of the system is identical to that shown in FIG. 1.

In FIG. 2, the node station 100 includes O/E converters 101 and 102, E/O converters 103 and 104, a master (or upper) loop-back circuit 121, and a slave (or lower) loop-back circuit 122. The node station 100 also includes a ring control circuit (RCS) comprising of a microprocessor unit (MPU) 106, a read-only memory (ROM) 107, a random-access memory (RAM) 108, a transmission data store buffer memory 109, a reception data store buffer memory 110, and a loop monitoring circuit 105. The node station 100 further includes a series-connected buffer memory 111, switching circuit 116, buffer memory 112, switching circuit 117, buffer memory 113, switching circuit 118, buffer memory 114, and switching circuit 119, as shown in FIG. 2, between the master loop-back circuit 121 and the loop monitoring circuit 105. The node station 100 includes a buffer memory 115 between the master and the slave loop-back circuits 121 and 122. The node station 100 also includes a system clock generator 120 for activating the above circuit elements.

Ring stations (RS1 to RS4) 11 to 14 are connected to the switching circuits 116 to 119. Each of the ring stations 11 to 14 may be connected "in line" in the main loop line 40 by the corresponding switching circuit. Each of the buffer-memories 111 to 114 temporarily stores data for the corresponding ring station.

The O/E converter 101 receives an optical signal on the main loop line 40 and converts it to an electrical signal. Similarly, the O/E converter 102 receives an optical signal on the sub-loop line 50 and converts it to an electrical signal. The E/O converters 103 and 104 convert electrical signals to optical signals on the loop lines 40 and 50.

Figure 3:
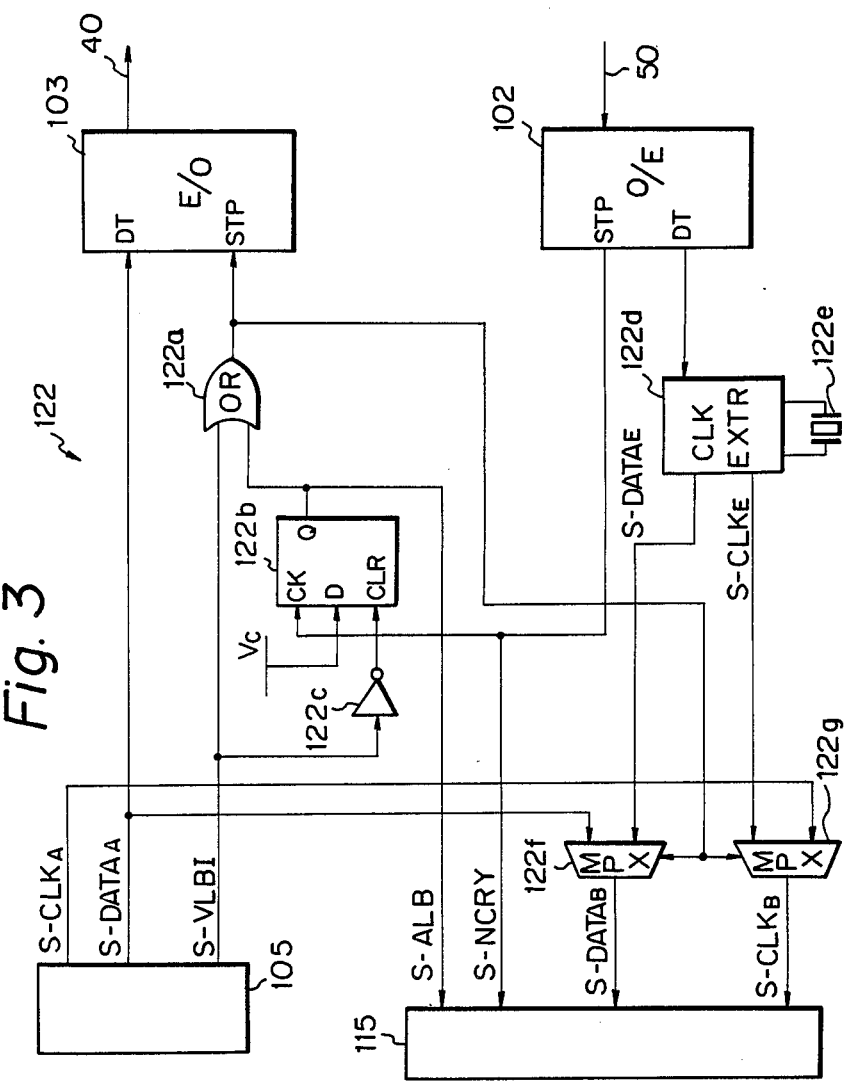
FIG. 3 is a circuit diagram of a loop-back circuit shown in FIG. 2.

FIG. 3 is a specific circuit diagram of the slave loop-back circuit 122. The slave loop-back circuit 122 includes an OR gate 122a, a delay-type flip-flop (D-F/F) 122b, an inverter 122c, and a clock extraction circuit 122d provided with an oscillator 122e. The slave loop-back circuit 122 also includes a data multiplexer 122f and a clock signal multiplexer 122g.

The slave loop-back circuit 122 receives a clock signal S-CLK$_A$, data signal S-DATA$_A$, and a voluntary loop-back indication signal S-VLBI from the loop monitor circuit 105. The data signal S-DATA$_A$ is supplied to a data input terminal (DT) of the E/O converter 103 and the multiplexer 122f. The clock signal S-CLK$_A$ is supplied to the multiplexer 122g. The voluntary loop-back indication signal S-VLBI is supplied to a stop terminal (STP) of the E/O converter 103 through the OR gate 122a, thus stopping the conversion of the signal in the E/O converter 103. The voluntary loop-back indication signal S-VLBI is also supplied to the inverter 122c and then to a clear terminal (CLR) of the D-F/F 122b, thus clearing the D-F/F 122b.

The O/E converter 102 outputs a data signal, which was received as an optical signal on the sub-loop line 50 and is converted into an electrical signal, at an output terminal (DT) to the clock extraction circuit 122d. The clock signal S-CLK$_E$ extracted at the clock extraction circuit 122d is supplied to the multiplexer 122g. Simultaneously, the clock extraction circuit 122d extracts a data signal from the data signal output from the O/E converter 102 and outputs it to the multiplexer 122f. When the data signal on the sub-loop line 50 is interrupted in a predetermined period, the O/E converter 102 outputs a no-carrier signal S-NCRY. The no-carrier signal S-NCRY is supplied to a clock terminal (CK) at the D-F/F 122b. A delay input terminal (D) at the D-F/F 122b receives a constant voltage V$_c$, thus the D-F/F 122b is set in response to the no-carrier signal S-NCRY. An output signal at an output terminal (Q) of the D-F/F 122b is supplied to the stop terminal (STP) of the E/O converter 103. The output signal from the D-F/F 122b indicates an automatic loop-back operation, thus is named an "automatic loop-back signal S-ALB".

The output signal of the OR gate 122a is supplied to the multiplexers 122f and 122g. In a normal mode, the output signal in question is low level. In this case (the low level), the data signal S-DATA$_E$ and the clock signal S-CLK$_E$ from the clock extraction circuit 122d are selected at the multiplexers 122f and 122g and supplied to the main loop-back circuit 121 through the buffer memory 115. On the other hand, in a loop-back mode, the signal output from the OR gate 122a is a high level, with a resultant selection of the data signal S-DATA$_A$ and the clock signal S-CLK$_A$, as an output data signal S-DATA$_B$ and an output clock signal S-CLK$_B$, by the multiplexers 122f and 122g.

The master loop-back circuit 121 has a similar construction to the slave loop-back circuit 122. Accordingly, the above explanation of the operation of the slave loop-back circuit 122 can be applied to the master loop-back circuit 121.

FIGS. 4a to 4d are views explaining the basic loop-back operation between the node station 100 and a node station 200, which station 200 has the same construction as the node station 100. FIGS. 4a to 4d show only the lower side circuits of the node station 100, i.e., the loop monitor circuit 105, the slave loop-back circuit 122, the E/O converter 103, and the O/E converter 102, and the upper side circuits of the node station 200, i.e., an O/E converter 201, an E/O converter 204, and a master loop-back circuit 221. The E/O converter 103 and the O/E converter 201 are connected by means of the main loop line 40. The O/E converter 102 and the E/O converter 204 are also connected by means of the sub-loop line 50.

Figure 4A:
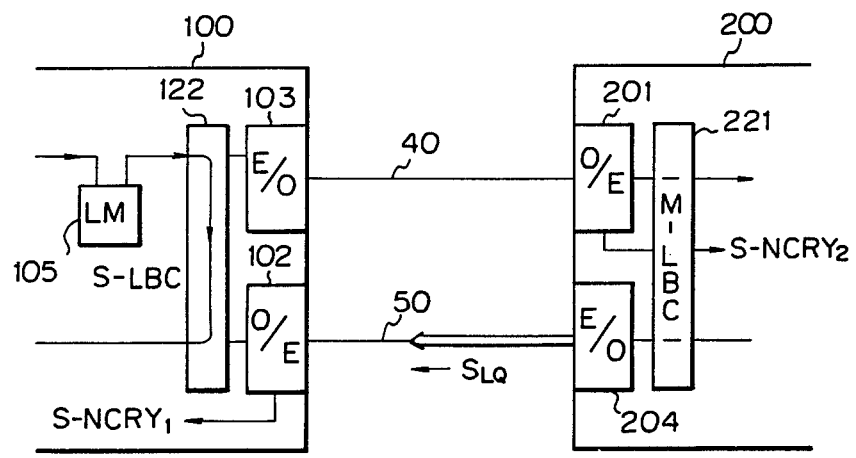
FIGS. 4a to 4d are views illustrating the transmission operation between the node stations shown in FIG. 2.
Figure 4B:
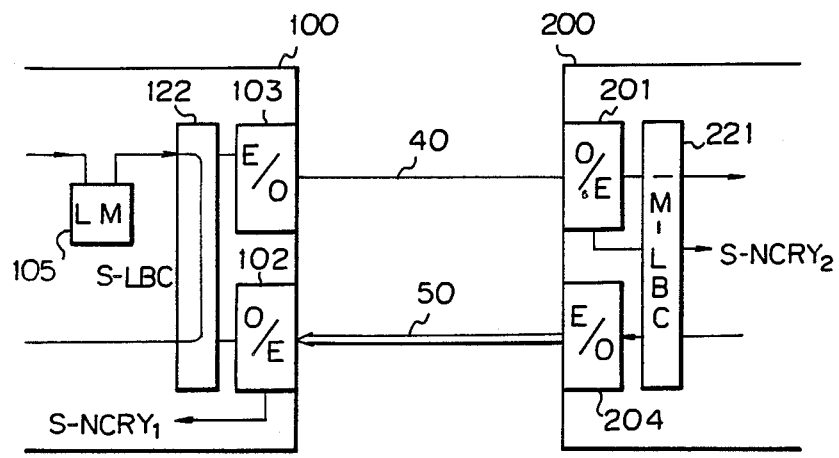
Figure 4C:
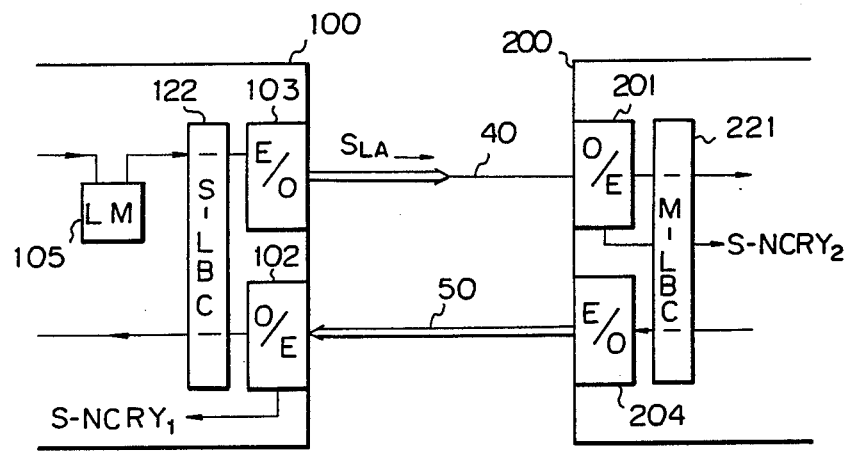
Figure 4D:
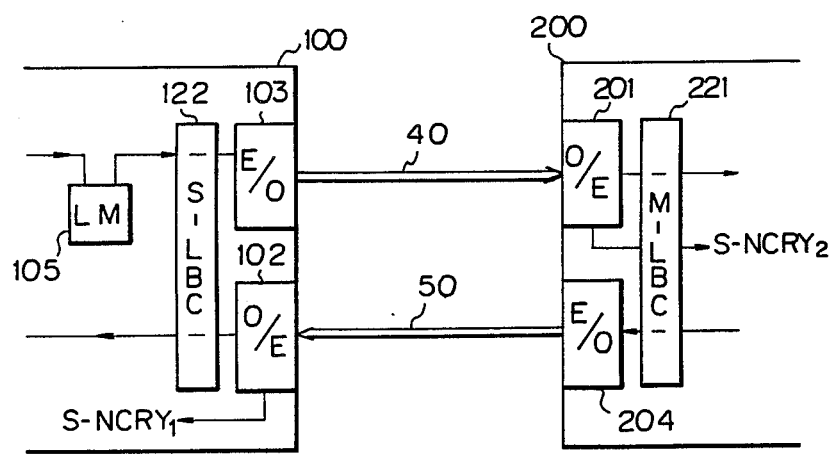

The loop-back release operation will now be explained. In an initial condition, the slave loop-back circuit 122 and the master loop-back circuit 221 are in a loop-back OFF state. FIG. 4a indicates the loop-back circuit 122 is in the loop-back ON state when a power source of the node station 200 is turned on, when the node station 200 receives a loop-back release instruction frame signal, or when an operator demands the loop-back release operation through an operator panel (not shown) on the node station 200, the loop-back circuit 221 is placed in a loop-back release state (or loop-back OFF state) as shown in FIG. 4a. In FIG. 4a, the node station 200 outputs a light signal S$_{LQ}$ on the sub-loop line 50 and waits for an answer signal. In FIG. 4b, the light signal S$_{LQ}$ from the node station 200 reaches the node station 100. In FIG. 4c, the node station 100 releases the loop-back ON state in the loop-back circuit 122, then outputs an answer light signal S$_{LA}$ on the main loop line 40. In FIG. 4d, when the answer light signal S$_{LA}$ on the main loop line 40 reaches the node station 200, the loop-back release operation between the node stations 100 and 200 is completed. The loop-back release operation between other node stations is similarly effected. As a result, all node stations in the loop transmission system are ring-connected through the loop lines 40 and 50.

FIG. 5 is an example of a transmission data format in accordance with "token" standard IEEE 802.5.

Figure 6B:
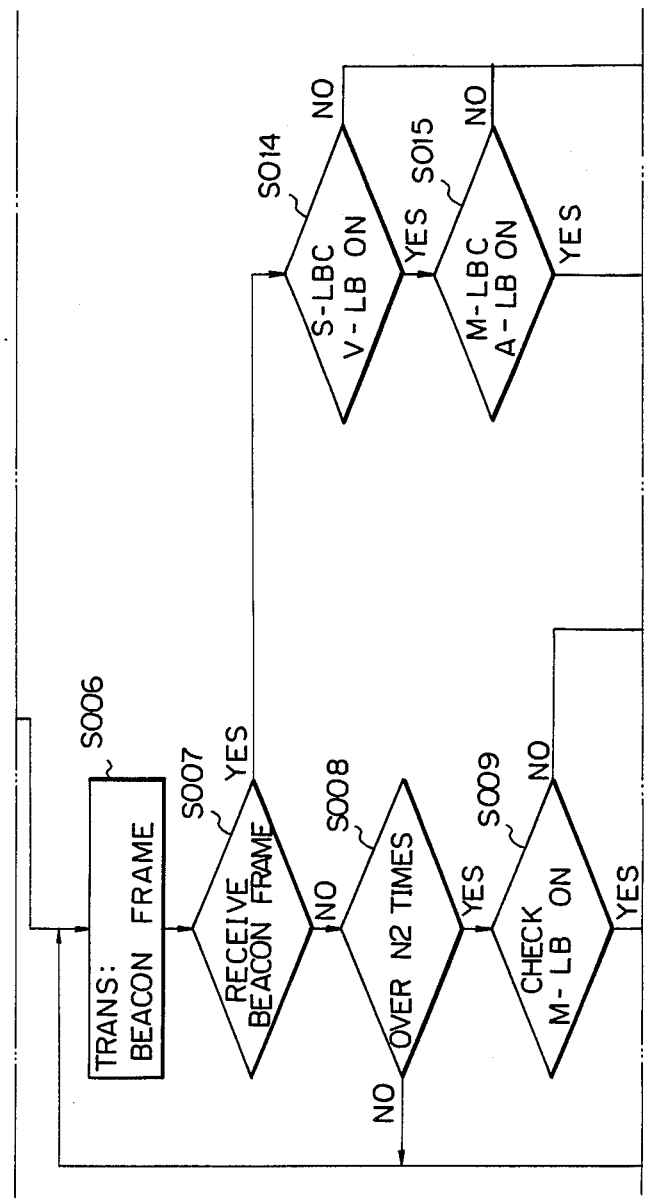
FIG. 6 including 6a–6c, is a flow chart explaining the operation of the node station shown in FIG. 2.
Figure 6C:
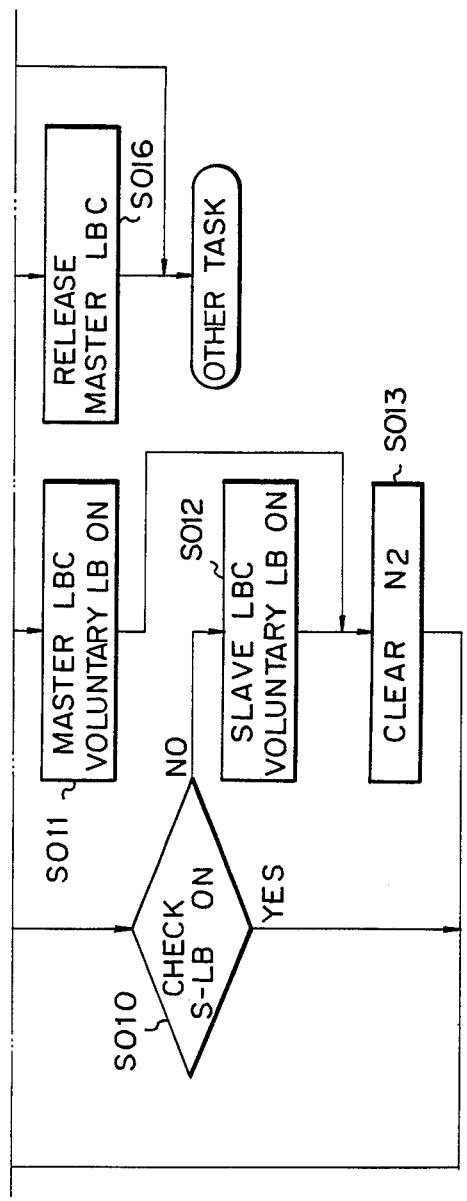

FIG. 6, including 6a-6c, is a flow chart showing an automatic loop (link) configuration control (ALCC) operation in the ring control circuit (RCS), comprising the MPU 106, the ROM 107 storing a control program, the RAM 108 for temporarily storing data, the transmission data store buffer memory 109, the reception data store buffer memory 110, and the loop monitor circuit 105.

The operation of the RCS is as follows:

STEP 001 (S001): Checks to see if a time $T_2$ has elapsed.

A timer for the time $T_2$ interval is reset when a frame signal is received and is counted up during a predetermined period. Accordingly, the elapse of the time $T_2$ indicates that a new frame signal has not been received during the time $T_2$. If the timer does not reach the time $T_2$, the operation is bypassed, thus the control of the RCS goes to another task. If the timer reaches the time $T_2$, the control advances to a next step S002.

STEP 002 (S002): Transmits a monitor recovery frame (MRF) signal to the next node station through the main loop line 40.

In the above step; a monitor recovery frame signal is a special frame signal which may be transmitted only when the frame reproduction operation is effected.

STEP 003 (S003): Checks to see if a monitor recovery frame signal reception check number N1 reaches a predetermined number.

The number N1 is cleared before the transmission of the monitor recovery frame signal and is increased by one after every completion of the transmission of the monitor recovery frame signal at the step S002. The above predetermined number is 50 in this embodiment. When the number N1 exceeds a predetermined number, it indicates a failure of the reproduction of the frame signal. The control of the RCS then advances to a step S006. On the other hand, when the number N1 does not exceed the predetermined number, the following operations may be effected. The above number check may be substituted for by a check on a predetermined time lapse.

STEP 004 (S004): Checks to see if of the frame signal has been received.

The reception of the frame signal indicates that the frame reproduction has succeeded. Accordingly, the control of the RCS advances to another task. On the other hand, when the frame signal has not yet been received, the control of the RCS advances to a next step S005.

STEP 005 (S005): Checks to see if a predetermined time $T_5$ elapsed for receiving the frame signal.

When a predetermined time $T_5$, has not elapsed, the ring control circuit waits until the frame signal is received. On the other hand, when the predetermined time $T_5$ has elapsed, this means a failure in the reproduction of the frame signal for the transmitted monitor recovery frame signal at the step S002, thus the ring control circuit repeats the operations of the steps S002 to S005.

STEP 006 (S006): Transmits a beacon frame signal to the next node station.

STEP 007 (S007): Checks for reception of an answer beacon frame signal.

When the answer beacon frame signal is received, the control of the RCS goes to a step S014. Otherwise, the following operations are effected.

STEP 008 (S008): Checks to see if a beacon frame signal reception check number N2 reaches has reached a predetermined number.

The number N2 is treated as the number N1 set forth above. The number N2 is previously cleared before the transmission of the beacon frame signal and is increased by one for every completion of the transmission of the beacon frame signal at the step S006. The number N2 is also 50 in the embodiment. When the number N2 is not greater than a predetermined number, the above operations of the steps S006 and S007 are repeated. On the other hand, if the number N2 is greater than the predetermined number, the ring control circuit will effect the following operations. Clearly, the above number check may also be substituted for by a check on the elapse of a predetermined time.

STEP 009 (S009): Checks to see if the master loop-back circuit is in a loop-back ON state or loop-back OFF state.

When the master loop-back circuit is in the loop-back release (OFF) state for the loop-back, the control of the RCS skips to a step S011. Otherwise, the control of the RCS advances to a step S010.

STEP 010 (S010): Checks whether the slave loop-back circuit is in a loop-back ON state or loop-back OFF state.

When the slave loop-back circuit is in a loop-back release state (OFF state), the control of the RCS advances to a step S012. Otherwise, the control of the RCS returns to the step S006 and thus the above operations in the steps S006 to S010 are repeated.

STEP 011 (S011): Outputs a voluntary loop-back indication signal S-VLBI to the master loop-back circuit, thus placing the master loop-back circuit in a loop-back ON state.

After that, the control of the RCS skips to a step S013.

STEP 012 (S012): Outputs a voluntary loop-back indication signal S-VLBI to the slave loop-back circuit.

The slave loop-back circuit is placed in the voluntary loop-back ON state. After that, the control of the RCS continues to a step S013.

STEP 013 (S013): Clears the above number N2 to zero and returns to step S006.

STEP 014 (S014): Checks whether the slave loop-back circuit is in a voluntary loop-back ON state.

When the slave loop-back circuit is in a voluntary loop-back ON state, the operation in the RCS continues to step S015. Otherwise, the control the RCS skips to another task.

STEP 015 (S015): Checks whether the master loop-back circuit is in an automatic loop-back ON state.

The above automatic loop-back ON state is defined as the state where the main and sub-loop line are connected in the loop-back circuit when the light signal or the carrier is extinguished (lost). When the master loop-back circuit is in an automatic loop-back ON state, the operation in the RCS continues to step S016. Otherwise, the operation for the automatic loop configuration control is terminated.

STEP 016 (S016): Releases the loop-back ON state of the master loop-back circuit.

A variety of automatic loop configuration control operations in the loop transmission system will now be explained.

First referring to FIGS. 7a to 7g, the automatic loop configuration control operation when a failure occurs in the sub-loop line 50 will be explained.

In FIGS. 7a to 7g, the loop transmission system includes five node stations (NS1 to NS5) 100 to 500 which are link connected by the main and sub-loop lines 40 and 50. To simplify the drawings, only the loop monitor circuits (LM) 105, 205, 305, 405, and 505 which are connected in the loop by the main loop line 40 and the buffer memories (BM) 115, 215, 315, 415, and 515 which are connected in loop by the sub-loop line 50 are shown. The ring stations are omitted.

In FIG. 7a, it is assumed that a fault occurs at a fault point FP between the node stations 300 and 400. The fault may be a breakdown of the sub-loop line 50 between the above node stations 300 and 400, distortion of a light emitting diode (LED) in the E/O converter (not shown) in the node station 400, or the like. The fault results in extinction (loss) of the data to the node station 300. However, note that the above failure cannot be detected in a normal operation mode, because the data is not transmitted on the sub-loop line 50 during the normal operation.

In FIG. 7b, when the node station 100 is stopped due to a power failure or other trouble, the automatic loop-back operation in the ring control circuit in the node station, as mentioned before with reference to FIG. 6, may be effected in the node stations 200 and 500. As a result, the ring control circuit in the node station 200 places the master loop-back circuit 221 in the loop-back ON state, which means connection of the master and sub-loop lines 40 and 50. Similarly, the slave loop-back circuit 522 is rendered in the loop-back ON state. In this loop configuration, the data may be transmitted on the sub-loop line 50. However, the data on the sub-loop line 50 is obviously extinguished at the fault point FP. The node station 200 detects extinction of the free "token" signal, then starts the operation for transmitting the monitor recovery frame signal as mentioned with regard to step S002 in FIG. 6. The monitor recovery frame signal is also extinguished at the fault point FP, with a resultant failure of frame signal reproduction. Then, the ring control circuit in the node station 200 outputs a beacon frame signal on the sub-loop line 50. However, the beacon frame signal is also extinguished at the fault point FP.

Figures 7C, 7D, 7E:
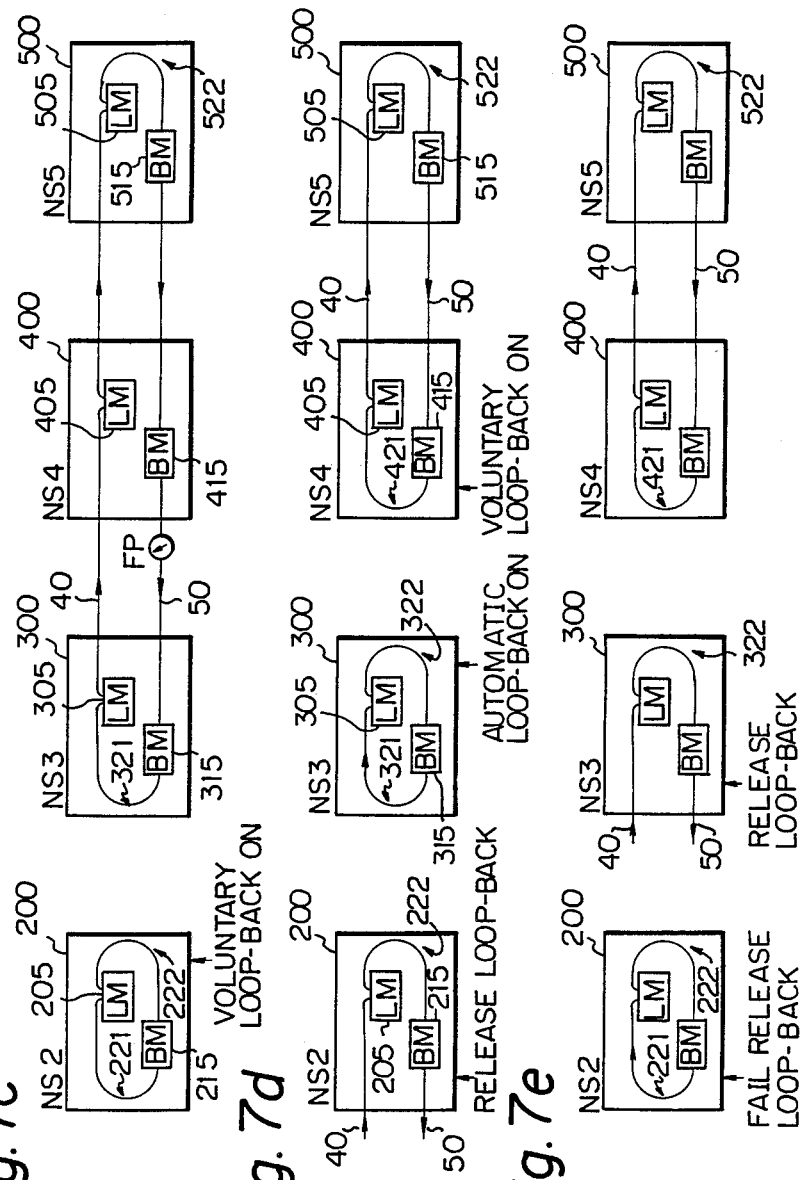

In FIG. 7c, the ring control circuit in the node station 200 detects the failure of the recovery operation on the basis of retransmission of the beacon frame signal. First, the node station 200 checks the master loop-back circuit 221. In this case, the master loop-back circuit 221 is already in a loop-back ON state. Next, the node station checks the slave loop-back circuit 222 and outputs the voluntary loop-back indication signal to the slave loop-back circuit, since the state in the slave loop-back circuit 222 is a loop-back OFF state. The slave loop-back circuit 222 is placed in the voluntary loop-back ON state. As a result, the node station 200 stands as an isolated system which has degenerated and has a closed loop line therein.

Accordingly, the node station 300 cannot receive the light signal or the carrier from the node station 200. The node station 300 places the master loop-back circuit in the automatic loop-back ON state. The node station 300 detects the extinction of the frame signal, as similar to the node station 200, and starts the operation for transmitting the monitor recovery frame signal to the node station 400. The monitor recovery frame signal is extinguished at the fault point FP, with a resultant failure of the frame signal reproduction. Then, the node station 300 outputs a beacon frame signal on the sub-loop line 50. However, the beacon frame signal is extinguished at the fault point FP.

In the status illustrated in FIG. 7c, the ring control circuit in the node station 200 transmits the beacon frame signal. The beacon frame signal passes through a closed loop line in the node station 200, resulting in reception of the beacon frame signal at the loop monitor circuit (LM) 205. After that, the ring control circuit in the node station 200 investigates the state of the master loop-back circuit 221. In this case, the master loop-back circuit 221 is in the automatic loop-back ON state. Then, the ring control circuit tries to release the loop-back ON state of the master loop-back circuit 221, as shown in FIG. 7d.

As shown in FIG. 7d, since the recovery operation as mentioned above did not succeed, the ring control circuit in the node station 300 investigates the state of the master loop-back circuit 321 therein. The state is the loop-back ON. Next, the ring control circuit investigates the state of the slave loop-back circuit 322 therein. The state is the loop-back OFF. Accordingly, the ring control circuit outputs a voluntary loop-back indication signal to the slave loop-back circuit, resulting in a voluntary loop-back ON state of the slave loop-back circuit 322. As a result, the node station 300 has a closed loop line therein.

The node station 400 cannot receive the light signal or the carrier on the main loop line 40. Therefore, the ring control circuit in the node station 400 outputs an automatic loop-back indication signal to the master loop-back circuit 421, resulting in an automatic loop-back ON state of the master loop-back circuit 421.

In FIG. 7e, the node station 200 recognizes a failure of the release of the loop-back on the master loop-back circuit 221, because the slave loop-back circuit 522 in the node station 500 is in a loop-back ON state. Then, the master loop-back circuit 221 is again placed in the automatic loop-back ON state, resulting in reformation of a closed loop line therein.

Since the closed loop line is formed in the node station 300 as shown in FIG. 7d, the recovery succeeds in the node station 300. The ring control circuit in the node station 300 checks the state of the master loop-back circuit 321. The state is the automatic loop-back ON. Then, the ring control circuit outputs a release loop-back ON signal to the master loop-back circuit 321, resulting in release of the loop-back ON state in the master loop-back circuit 321.

Figure 7F:
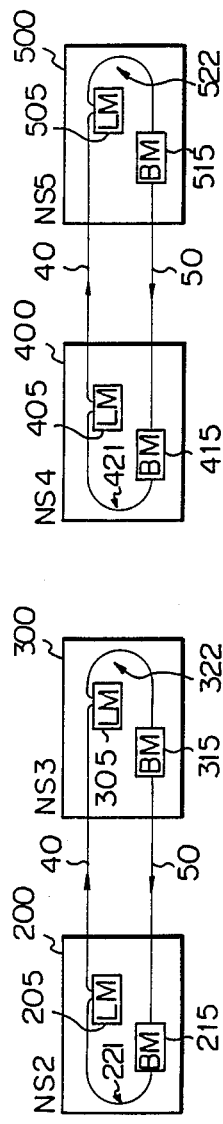

In FIG. 7f, the node station 200 may receive the light signal on the sub-loop line 50 from the node station 300, whereby the ring control circuit in the node station 200 outputs a release loop-back signal to the slave loop-back circuit 222, resulting in release of the loop-back state of the slave loop-back circuit 222.

Figure 7G:
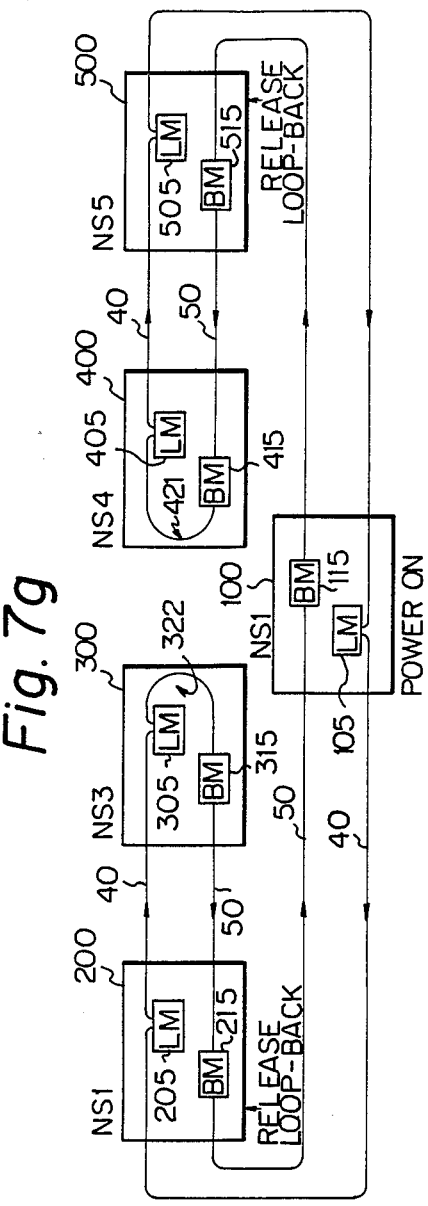

In FIG. 7g, as the node station 100 is restored by, for example the restoration of the power, i.e., power source on (PWR ON), the ring control circuit in the node station 100 outputs a light signal on the sub-loop line 50 through the slave loop-back circuit 122 and the E/O converter 103 shown in FIGS. 2 and 3. The node station 500 receives the above light signal on the sub-loop line 50, whereupon the ring control circuit therein outputs a loop-back release signal to the slave loop-back circuit 522 therein, with a resultant release of the loop-back in the slave loop-back circuit 522. Consequently, the node station 100 and the node station 500 are again connected. Simultaneously, the ring control circuit in the recovered node station 100 outputs the light signal on the sub-loop line 50 through the master loop-back circuit 121 and the E/O converter 104 shown in FIG. 2. The node station 200 also receives the above light signal. The ring control circuit in the node station 200 outputs a loop-back release signal to the master loop-back circuit 221, resulting in release of the loop-back in the master loop-back circuit 221. Consequently, the node station 100 and the node station 200 are also again connected.

From the above sequence of operations, the fault point FP is found and removed from the transmission loop in the loop transmission system. As a result, the loop transmission system is reconfigured as shown in FIG. 7g and is operable without reduction of performance.

Next, the automatic loop configuration control operation when a fault occurs on the main loop line in the node station will be explained with reference to FIGS. 8a to 8d.

In FIG. 8a, the fault occurs on the main loop line 40 in the node station 300. The fault may be caused by the stopping of a clock signal for buffer memories, such as the buffer memories 111 to 114 in FIG. 2 for ring stations, such as the ring stations 11 to 14 in FIG. 2, connected to the node station 300, breakdown of the main loop line in the node station 300, failure of ring station switching circuits, such as the circuits 116 to 119 in FIG. 2, or other trouble. Due to the above fault, the data frame signal cannot pass through the main loop line 40. The ring control circuit in the node station 300 detects extinction of the free "token" and starts a monitor recovery operation as set forth above. However, the transmitted monitor recovery frame signal is extinguished at the fault point FP in the node station 300, resulting in failure of the monitor recovery operation.

In FIG. 8b, the ring control circuit in the node station 300 starts transmission of the beacon frame signal BF. The beacon frame signal is also extinguished at the fault point FP, thus does not reach the ring control circuit. Then, the ring control circuit in the node station 300 checks the loop-back state of the master loop-back circuit in the node station 300. In this case, the loop-back state is OFF.

Figure 8C:
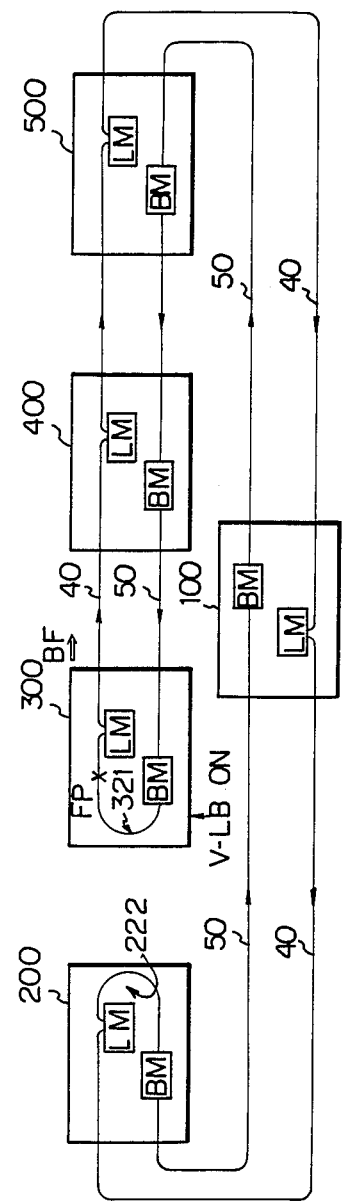

In FIG. 8c, the ring control circuit in the node station 300 places the master loop-back circuit 321 in a voluntary loop-back ON state, clears the counter of the beacon frame transmission number, and outputs the beacon frame signal. Nevertheless, the beacon frame signal is still extinguished at the fault point FP in the node station 300.

Due to disconnection between the node stations 200 and 300, the ring control station in the node station 200 places the slave loop-back circuit 222 in the automatic loop-back ON state.

Figure 8D:
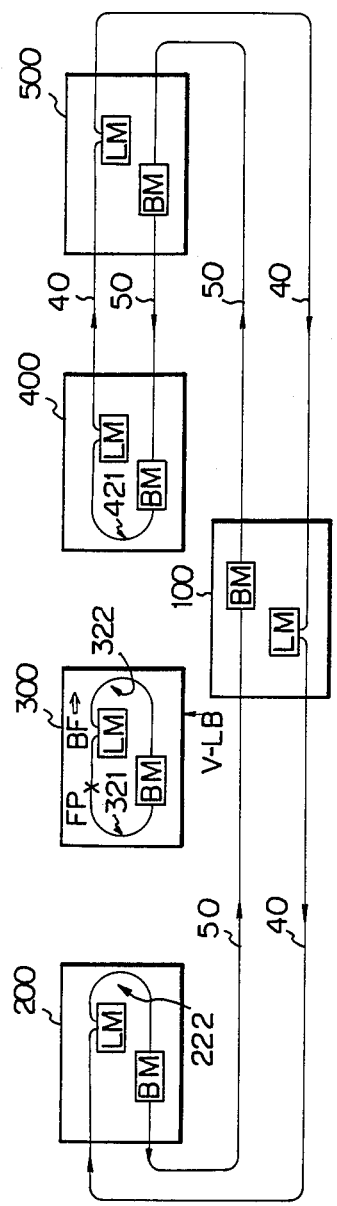

In FIG. 8d, the ring control circuit in the node station 300 detects the failure of the above recovery operation (transmission of the beacon frame signal). The ring control circuit again checks the loop-back state of the master loop-back circuit 321. Clearly, the loop-back state is already the loop-back ON state. Next, the ring control circuit checks the loop-back state of the slave loop-back circuit 322. The state of the slave loop-back circuit 322 is the loop-back OFF state. The ring control circuit places the slave loop-back circuit 322 in the loop-back ON state, resulting in a closed loop line therein. The ring control circuit continues to transmit the beacon frame signal.

Due to disconnection between the node station 300 and 400, the node station cannot receive the beacon frame signal and so places the master loop-back circuit 422 in the automatic loop-back ON state. The ring control circuit in the node station 400 outputs the monitor recovery frame signal on the main loop line 40. The monitor recovery frame signal is returned to the node station 400, on the main loop line 40, through the node stations 500, 100, and 200, in that order and, on the sub-loop line 50, the node stations 200, 100, and 500.

As can be seen from the above explanation, only the node station 300 having the fault point therein is removed from the loop transmission system. The remaining normal node stations are operable.

The automatic loop configuration control operation when the ring control circuit in the node station fails will be explained with reference to FIGS. 9a to 9i.

In FIG. 9a, the loop monitor circuit 305 in the ring control circuit in the node station 300 fails.

In FIG. 9b, the ring control circuit in the node station 400 detects extinction of the frame signal on the main loop line 40 and starts the monitor recovery operation. However, the monitor recovery frame signal transmitted from the node station 400 is extinguished at the fault point FP, that is, the loop monitor circuit 305 in the node station 300, resulting in failure of the monitor recovery operation. The ring control circuit in the node station 400 outputs the beacon frame signal on the main loop line 40. The beacon frame signal is also extinguished at the fault point FP, and thus cannot reach the ring control circuit in the node station 400.

In FIG. 9c, the ring control circuit in the node station 400 checks the master loop-back circuit 421 in the loop-back OFF state and places the master loop-back circuit 421 in the voluntary loop-back ON state. After that, the ring control circuit of the node station 400 again outputs the beacon frame signal on the main loop line 40. The beacon frame signal is also extinguished at the fault point FP in the node station 300.

In FIG. 9d, the ring control circuit in the node station 400 detects the failure of the above recovery operation (transmission of the beacon frame signal). The ring control circuit checks again the state of the master loop-back circuit 421 already placed in the loop-back ON state. Next, the ring control circuit checks the state of the slave loop-back circuit 422. In this case, the slave loop-back circuit 422 is in the OFF state. Accordingly, the slave loop-back circuit 422 is placed in the loop-back ON state by request from the ring control circuit. As a result, a closed loop is formed in the node station 400.

Due to disconnection between the node stations 400 and 500, the signal from the node station 400 cannot reach the node station 500. The ring station in the node station 500 places the master loop-back circuit 521 in the automatic loop-back ON state. The ring control station detects the extinction of the frame signal on the main loop line 40 and starts the monitor recovery operation. The monitor recovery frame signal is extinguished at the fault point FP in the node station 300, resulting in failure of the monitor recovery operation. Thus, the ring control circuit outputs the beacon frame signal on the main loop line 40.

In FIG. 9e, the ring control circuit in the node station 400 places the slave loop-back circuit 422 in the loop-back ON state, whereby the ring control circuit receives the beacon frame signal. However, since the master loop-back circuit 421 was already placed in the voluntary loop-back ON state, the release loop-back operation for the master loop-back circuit 421 is not effected.

Since the recovery operation (transmission of the beacon frame signal) does not succeed, the ring control circuit in the node station 500 checks the master loop-back circuit 521 in the loop-back ON state, and no loop-back operation for the master loop-back circuit 521 is effected. The ring control circuit checks the state of the slave loop-back circuit 522, which is in the loop-back OFF state, and places the slave loop-back circuit 522 into the voluntary loop-back ON state.

Due to the above disconnection between the node stations 500 and 100, the signal on the main loop line 40 output from the node station 500 cannot reach the node station 100. The ring control circuit in the node 100 places the master loop-back circuit 121 in the voluntary loop-back ON state. The above ring control circuit detects the extinction of the frame signal and starts the monitor recovery operation. However, the transmitted monitor recovery signal is naturally extinguished at the fault point FP in the node station 300, resulting in failure of the monitor recovery operation. Then, the ring control circuit in the node station 100 outputs the beacon frame signal on the master loop line 40.

As shown in FIG. 9f, the ring control circuit in the node station 500 attempts the recovery operation under the loop construction as shown in FIG. 9e. After that, the ring control circuit checks the cause of the loop-back ON state of the master loop-back circuit 521. In this case, the above cause is the automatic loop-back ON state. Then, the ring control circuit effects the operation for release of the loop-back ON state of the master loop-back circuit 521.

The ring control circuit in the node station 100 detects the failure of the recovery operation (transmission of the beacon frame signal). Then, the ring control circuit checks the state of the master loop-back circuit 121. It is in the loop-back ON state, so no operation is effected to the master loop-back circuit 121. On the other hand, since the slave loop-back circuit 122 is in the loop-back OFF state, the ring control circuit places the slave loop-back circuit 122 in the voluntary loop-back ON state.

Due to the disconnection between the node stations 100 and 200 by the above voluntary loop-back ON of the slave loop-back circuit 122 in the node station 100, the light signal cannot reach the node station 200. In response to this, the ring control circuit in the node station 200 places the master loop-back circuit 221 in the automatic loop-back ON state. The ring control circuit in the node station 200 detects the extinction of the frame signal and starts the monitor recovery operation. Obviously, the monitor recovery frame signal transmitted from the ring control circuit is extinguished at the fault point FP in the node station 300, resulting in failure of the monitor recovery operation. Then, the ring control circuit outputs the beacon frame signal on the main loop line 40 to the node station 300. However, the transmitted beacon frame signal is also extinguished at the fault point FP in the node station 300.

In FIG. 9g, the ring control circuit in the node station 400 receives the light signal on the sub-loop line 50 output from the node station 500 in which the master loop-back circuit 521 was placed in the loop-back OFF state, and thus places the slave loop-back circuit 422 in the loop-back OFF state, i.e., releases the loop-back ON state.

Since the recovery operation may have succeeded after the slave loop-back circuit 122 was placed in the loop-back ON state, the ring control circuit in the node station 100 checks the loop-back cause of the loop in the master loop-back circuit 121. The cause is the automatic loop-back, thus the ring control circuit requires the master loop-back 121 to release the loop-back ON state.

The ring control circuit in the node station 200 detects the failure of the recovery operation (transmission of the beacon frame signal) under the loop construction shown in FIG. 9f. The ring control circuit checks the state of the slave loop-back circuit 222 and places the slave loop-back circuit 222 in the voluntary loop-back ON state.

In FIG. 9h, the ring control circuit in the node station 500 receives the light signal on the sub-loop line 50 from the node station 100 and makes the slave loop-back circuit 522 release the loop-back ON state, resulting in reconnection between the node stations 500 and 100.

After the ring control circuit in the node station 200 places the slave loop-back circuit in the loop-back ON state as shown in FIG. 9g, the ring control circuit attempts the recovery operation under the closed loop construction shown in FIG. 9g. After that, since the loop-back cause of the loop-back in the master loop-back circuit 221 is the automatic loop-back ON state, the ring control circuit makes the master control circuit 221 release the loop-back ON state.

In FIG. 9i, the ring control circuit in the node station 100 receives the light signal output from the node station 200 and makes the slave loop-back circuit 122 release the loop-back ON state, resulting in reconnection between the node stations 100 and 200.

As mentioned above, the node station 300 including the fault point is identified and removed from the loop transmission system. On the other hand, normal node stations 100, 200, 400, and 500 are reconfigured as shown in FIG. 9i. The loop transmission system formed as shown in FIG. 9i is operable.

Referring to FIGS. 10a to 10f, the automatic loop configuration control operation when a fault occurs on the sub-loop line in the node station will now be explained.

Figure 10A:
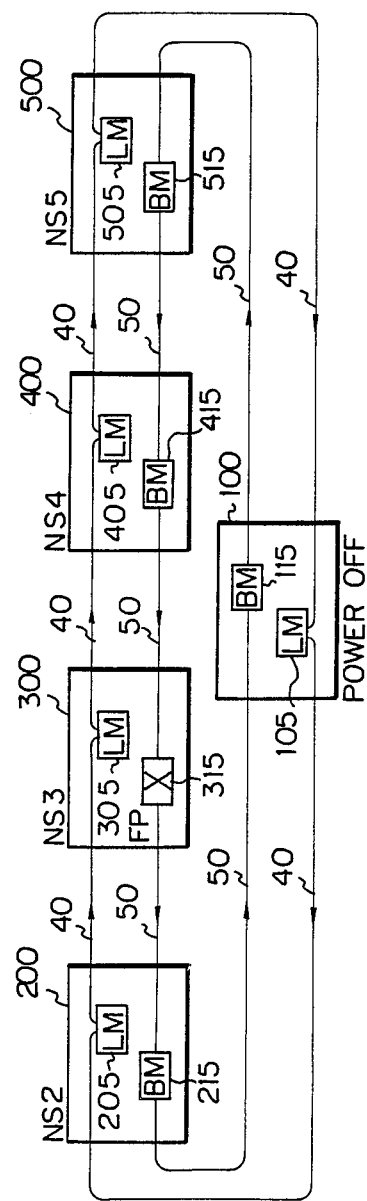

In FIG. 10a, the fault occurs on the sub-loop line 50 in the node station 300, more specifically, the fault occurs at the buffer memory (BM) 315, making it impossible for the data frame signal to pass therethrough on the sub-loop line 50. In this case, however, as mentioned above with reference to FIG. 7a, the above fault cannot be detected, because no signal passes through the sub-loop line 50 during the normal operation.

Figure 10B:
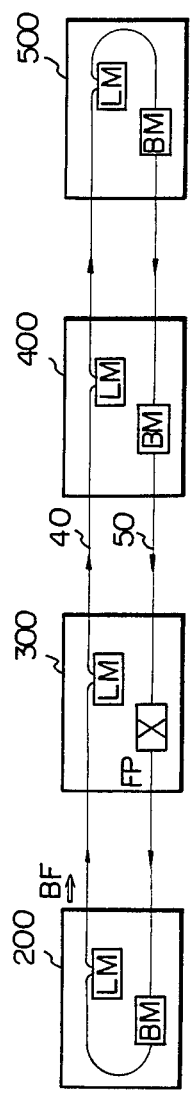

When the node station 100 fails by, for example, a power failure, the automatic loop-back operation of the ring control circuit in the node station 200 is effected to render the master loop circuit 221 in the loop-back ON state, as shown in FIG. 10b. However, the transmitted data frame signal is extinguished at the fault point FP.

In FIG. 10b, the ring control circuit in the node station 200 detects extinction of the data frame signal and then effects the monitor recovery operation. The monitor recovery frame signal transmitted from the ring control circuit is also extinguished at the fault point FP, resulting in failure of the monitor recovery operation. Subsequently, the ring control circuit in the node station 200 outputs the beacon frame signal BF. The beacon frame signal is also extinguished at the fault point FP.

In FIG. 10c, the ring control circuit in the node station 200 detects failure of the above recovery operation (transmission of the beacon frame signal). The ring control circuit checks the state of the master loop-back circuit 221. No loop-back operation for the master loop-back circuit 221 is required since the master loop-back circuit is in the loop-back ON state. The ring control circuit checks the state of the slave loop-back circuit 222 and, since the slave loop-back circuit 222 is in the loop-back OFF state, places it in the loop-back ON state.

Due to the disconnection between the node stations 200 and 300 caused by the above loop-back operation in the node station 200, the ring control circuit in the node station 300 cannot receive the signal on the master loop line 40 from the node station 200. Thus, it places the master loop-back circuit 321 in the loop-back ON state. The ring control circuit in the node station 300 detects extinction of the data frame signal output therefrom and starts the monitor recovery operation. The monitor recovery frame signal is, however, extinguished at the fault point FP, resulting in failure of the monitor recovery operation. The ring control circuit starts transmission of the beacon frame signal BF on the master loop line 40. The beacon frame signal is extinguished at the fault point FP.

As shown in FIG. 10d, the ring control circuit in the node station 200 succeeds in the recovery operation under the closed loop configuration in the node station 200 as shown in FIG. 10c. Then, the ring control circuit checks the state of the master loop-back circuit 221 and, since the state is automatic loop-back ON, effects the loop-back release operation of the master loop control circuit 221.

The ring control circuit in the node station 300 detects a failure of the recovery operation (transmission of the beacon frame signal). Then, the ring control circuit checks the state of the master loop-back circuit 321. Since the master loop-back circuit 321 is in the loop-back ON state, the ring control circuit, however, does not effect the loop-back operation. Next, the ring control circuit checks the state of the slave loop-back circuit 322 and, since the state is loop-back OFF, places the slave loop-back circuit 322 in the automatic loop-back ON state.

Due to the disconnection between the node stations 300 and 400 caused by the above loop-back operation in the node station 300, the ring control circuit in the node station 400 cannot receive the signal on the master loop line 40 from the node station 300, thus places the master loop-back circuit 421 in the automatic loop-back ON state.

The ring control circuit of the node station 200 detects a failure of the recovery operation (release of the loop-back ON state of the master loop-back circuit 221) mentioned above in FIG. 10d, since the node station 100 still fails. Then, the ring control circuit again places the master loop-back circuit 221 in the automatic loop-back ON state as shown in FIG. 10e.

As shown in FIG. 10e, the ring control circuit in the node station 300 continues transmission of the beacon frame signal BF.

As shown in FIG. 10f, when the node station 100 is rendered in the available state by restoring the power source thereto, the light signal on the sub-loop line 50 output from the node station 100 reaches the node station 500. At the same time, the light signal on the master loop line 40 output from the node station 100 reaches the node station 200. In response to reception of the light signal, the ring control circuit in the node station 500 places the slave loop-back circuit in the loop-back OFF state, resulting in connection between the node stations 500 and 100. Similarly, the ring control circuit in the node station 200 places the master loop-back circuit 221 in the loop-back OFF state, resulting in connection between the node stations 200 and 100.

The final reconfigured loop state is shown in FIG. 10f. Only the node station 300 including the fault point FP therein is bypassed.

Figure 11A:
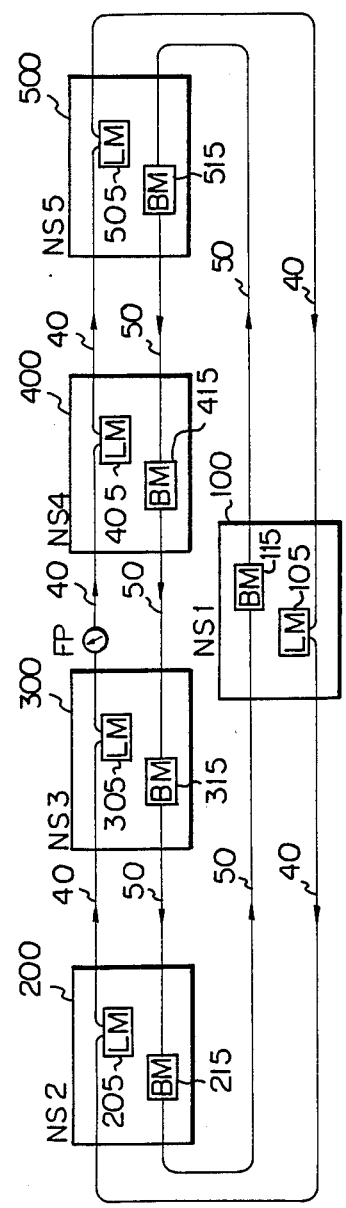
FIGS. 11a to 11c are views showing the automatic loop configuration control operation for a fifth type of fault.
Figure 11B:
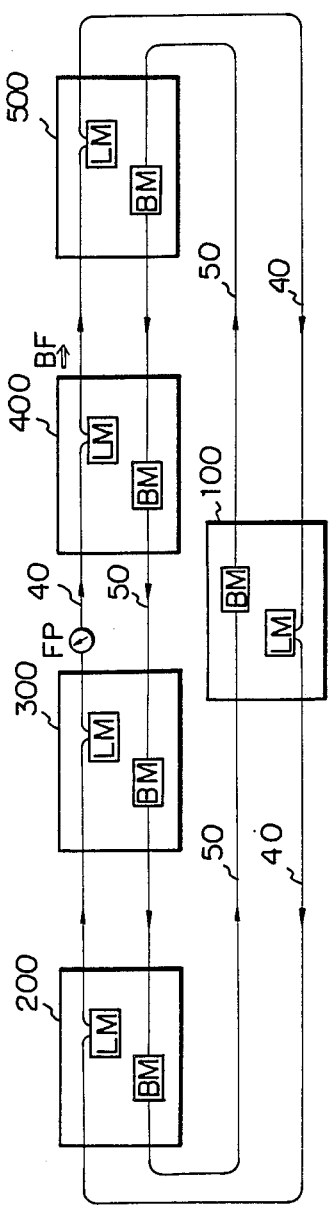
Figure 11C:
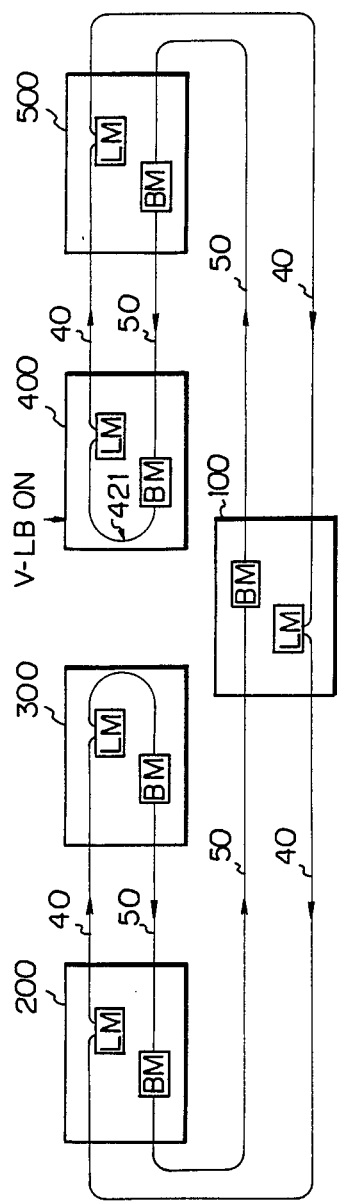

Referring to FIGS. 11a to 11c, the automatic loop configuration control operation when a fault occurs on the main loop line 40 will be explained.

In FIG. 11a, the fault occurs on the main loop line 40 between the node stations 300 and 400. As mentioned above with reference to FIG. 7a, the fault may be a breakdown of the main loop line 40, distortion of the light emitting diode in the E/O converter (not shown) in the node station 300, or the like.

Under this condition, the data frame signal cannot pass through the main loop line 40 in the loop transmission system.

In FIG. 11b, first, the ring control circuit in the node station 400 detects the extinction of the data frame signal and thus starts the monitor recovery operation. The monitor recovery frame signal is, however, extinguished at the fault point FP on the main loop line 40, resulting in failure of the monitor recovery operation. Then, the ring control circuit outputs the beacon frame signal BF on the main loop line 40. The beacon frame signal is also extinguished at the fault point FP.

As shown in FIG. 11c, the ring control circuit in the node station 400 detects a failure of the above recovery operation (transmission of the beacon frame signal). Then, the ring control circuit in question checks the state of the main loop-back circuit 421. The state is loop-back OFF. Accordingly, the main loop-back circuit 421 is rendered in the voluntary loop-back ON state.

The ring control circuit in the node station 300 places the slave loop-back circuit 322 in the automatic loop-back ON state.

As a result, the fault point FP is removed from the loop transmission system.

In the above embodiment, the fault on the sub-loop line, as mentioned above with reference to FIGS. 7a to 7g and FIGS. 10a to 10f, may be detected by occurrence of another fault on the main loop line, such as a fault of the node station. This is because the sub-loop line is not used for transmission of data in a normal operation node and accordingly the fault on the sub-loop line can be neglected in a normal operation mode.

As mentioned above with reference to the variety of failure modes in the loop transmission system, in accordance with the present invention, the loop transmission system without the extra supervisory station can automatically detect a fault in the loop transmission system, identify a fault point, remove a fault point which cannot be removed from the loop transmission system by itself, and reconstruct a closed ring loop transmission system which is operable by use of the normal node stations.

As a result, the loop transmission system in accordance with the present invention can increase the availability of operation.

In addition, according to the automatic link configuration control of the present invention discussed above, the time for detecting a fault and a fault point and accordingly for correction of the fault point is reduced, with a resultant increase of maintainability.

Many widely different embodiments of the present invention may be constructed without departing from the spirit and scope of the present invention. It should be understood that the present invention is not limited to the specific embodiments described in this specification, except as defined in the appended claims.

For example, in the above embodiment, an optical loop transmission system including double fiber cables 40 and 50 and optical circuits, such as the E/O converters 103 and 104 and the O/E converters 101 and 102 in the node station in FIG. 2, was discussed. Clearly, however, the present invention can be applied to other non-optical loop transmission systems as well.

In addition, in the above embodiment, as shown in FIGS. 2 and 6, the ring control circuit is realized by a microprocessor system.

The ring control circuit may be realized by using other circuit technologies, such as an electrical logic circuit.

I claim:

1. A loop transmission system, comprising:
   a plurality of node means each having first and second data transmission paths; and
   first and second loop transmission lines, operatively connected to said plurality of node means, transmitting data with a carrier signal in opposite directions, each of said lines forming, with each of said data transmission paths in said node means, a separate closed loop transmission line when in a normal mode;
   each of said node means comprising:
      first loop-back means, operatively connected to said first and second loop transmission lines and said first and second data transmission paths at one end in said node means, for monitoring the carrier signal received from said first loop transmission line, and connecting said first and second data transmission paths in said first loop-back means when the carrier signal from said first loop transmission line is lost;
      second loop-back means, connected to said first and second loop transmission lines and said first and second data transmission paths at the other end in said node means, for monitoring the carrier signal received from said second loop transmission line, connecting said first and second data transmission paths in said second loop-back means when the carrier signal from said second loop transmission line is lost, and restoring said first and second loop transmission lines to the normal mode to maintain said separate closed loop transmission lines when the carrier from said second loop transmission line signal reappears;
      loop monitor means, connected to the first data transmission path, for monitoring the transmitted data, detecting an abnormal state in the transmitted data, and detecting a recovery from the abnormal state;
      activating means for activating at least one of said first and second loop-back means to loop-back in response to the detection of the abnormal state; and
      restoring means for restoring the at least one of said first and second loop-back means from the loop-back state in response to the detection of recovery from the abnormal state.

2. A loop transmission system, comprising:
   a plurality of node means; and
   first and second loop transmission lines, operatively connected to said plurality of node means, transmitting signals in opposite directions, each of said lines forming a separate closed loop transmission line including said plurality of node means when in a normal mode;
   each node means comprising:
      first and second loop-back means, operatively connected to said first and second loop transmission lines at opposite ends in said node means, for passing signals on said first and second loop transmission lines through said node means, and
      ring control means, operatively connected between said first and second loop-back means, for monitoring signals passing through said node means to operatively connect said first and second loop transmission lines or restoring said first and second loop transmission lines in said normal mode, and transmitting a signal on said first or second loop transmission lines through said first or second loop-back means using said plurality of node means, said loop transmission system detecting a fault point therein and constructing a transmission loop line not including said fault point, said ring control means in said node means comprising:
         means for detecting an abnormal state in the transmitted data on said first and second loop transmission lines;
         means for activating said first loop-back means to connect said first and second loop transmission lines in said first loop-back means when a predetermined format signal on said first loop transmission line is extinguished;
         means for activating said second loop-back means to automatically connect said first and second loop transmission lines in said second loop-back means when another predetermined format signal on said second loop transmission line is extinguished;
         means for activating said first loop-back means to restore the connection of said first and second loop transmission lines when said predetermined format signal on said first loop transmission line appears;
         means for activating said second loop-back means to restore the connection of said first and second loop transmission lines when said other predetermined signal on said second loop transmission line appears;
         means for activating said first and/or second loop-back means to place said first and second loop transmission lines in a loop-back state when said abnormal state detecting means detects the abnormal state;
         means for detecting a normal state in the transmitted data on said first and second loop transmission lines after said first and/or second loop-back means are placed in the loop-back state; and
         means for activating said first and/or second loop-back means to restore the connection of said first and second loop transmission lines when said normal state detecting means detects the normal state.

3. A loop transmission system according to claim 2, wherein said abnormal state detecting means detects the absence of a predetermined format signal during a predetermined period and said normal state detecting means transmits said predetermined format signal.

4. A loop transmission system according to claim 3, wherein said abnormal state detecting means detects the absence of said predetermined format signal and transmits a replacement signal having the same format, and when said abnormal state detecting means does not detect said transmitted replacement signal during a predetermined number of repetitions of the above detecting and transmitting operations, said abnormal detecting means determines the loop transmission system is in an abnormal state.

5. A loop transmission system according to claim 4, wherein said means for activating said first and/or second loop-back means to connect the first and second loop transmission lines first activates said first loop-back means when said normal state detecting means does not detect a normal state after said first loop-back means is placed in the loop-back state, then activates said second loop-back means to place it in the loop-back state, and then, when said normal state detecting means detects a normal state when both loop-back means are in the loop-back state, activates said first loop-back means to restore the connections to the normal mode.

6. A loop transmission system according to claim 1, wherein said activating means activates said first loop-back means to loop-back in response to the detection of the abnormal state, and also activates said second loop-back means to loop-back in response to the detection of the abnormal state when said first loop-back means is in a loop-back state.

7. A loop transmission system according to claim 6, wherein each of said first and second loop-back means further comprises storage means for storing information indicating whether each loop-back means is in the loop-back state because of the loss of the carrier signal from either the first or second loop transmission lines and said restoring means restores said first loop-back means to the non-loop-back state in response to the detection of recovery from the abnormal state only when the first loop-back means is in the loop-back state because of the loss of the carrier signal from said first transmission line and the second loop-back means is in the loop-back state because of the loss of the carrier signal from said second loop transmission line.

8. A loop transmission system according to claim 7, wherein said first loop-back means restores said first and second loop transmission lines to the normal mode to maintain said separate closed loop transmission lines when the lost carrier signal from said first loop transmission line re-appears.

9. A loop transmission system according to claim 1, wherein said loop monitor means detects an absence of predetermined format data during a predetermined period and transmits the predetermined format data.

10. A loop transmission system according to claim 9 wherein said loop monitor means determines that the loop transmission system is in the abnormal state when the transmitted predetermined format data is not detected after a predetermined number of repetitions of the transmission of the predetermined format data.

* * * * *

UNITED STATES PATENT AND TRADEMARK OFFICE
CERTIFICATE OF CORRECTION

PATENT NO. : 4,710,915

DATED : December 1, 1987

INVENTOR(S) : Takeshi Kitahara

It is certified that error appears in the above-identified patent and that said Letters Patent is hereby corrected as shown below:

Col. 3, line 6, delete "loop" (first occurrence).

Col. 4, line 68, delete "of".

Col. 7, line 36, delete "of";

Col. 7, line 62, delete "reaches".

Col. 16, line 31, change "rendered" to --placed--;

Col. 16, line 43, change "node" to --mode--.

Col. 18, line 8, change "," to --;--.

Signed and Sealed this

Twelfth Day of July, 1988

*Attest:*

DONALD J. QUIGG

*Attesting Officer*   *Commissioner of Patents and Trademarks*